(12) United States Patent
Xu et al.

(10) Patent No.: US 11,620,558 B1
(45) Date of Patent: Apr. 4, 2023

(54) ITERATIVE MACHINE LEARNING BASED TECHNIQUES FOR VALUE-BASED DEFECT ANALYSIS IN LARGE DATA SETS

(71) Applicant: Amazon Technologies, Inc., Seattle, WA (US)

(72) Inventors: Yifan Xu, Redmond, WA (US); Xue Wang, Seattle, WA (US); Marc Wichterich, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 262 days.

(21) Appl. No.: 17/002,274

(22) Filed: Aug. 25, 2020

(51) Int. Cl.
*G06N 7/00* (2006.01)
*G06Q 30/0601* (2023.01)
*G06K 9/62* (2022.01)
*G06N 20/00* (2019.01)

(52) U.S. Cl.
CPC .......... *G06N 7/005* (2013.01); *G06K 9/6256* (2013.01); *G06N 20/00* (2019.01); *G06Q 30/0641* (2013.01)

(58) Field of Classification Search
CPC ...... G06N 7/005; G06N 20/00; G06K 9/6256; G06Q 30/0641
USPC ........................................................ 706/12
See application file for complete search history.

(56) References Cited

U.S. PATENT DOCUMENTS

| | | | |
|---|---|---|---|
| 6,169,969 B1 | 1/2001 | Cohen | |
| 6,327,561 B1 | 12/2001 | Smith et al. | |
| 6,363,381 B1 | 3/2002 | Lee et al. | |
| 6,697,998 B1 | 2/2004 | Damerau et al. | |
| 7,644,102 B2 | 1/2010 | Gaussier et al. | |
| 7,644,127 B2 | 1/2010 | Yu | |
| 7,725,475 B1 * | 5/2010 | Alspector | G06F 16/353 |
| | | | 707/758 |
| 7,912,705 B2 | 3/2011 | Wasson et al. | |
| 8,140,491 B2 | 3/2012 | Mandagere et al. | |
| 8,200,640 B2 | 6/2012 | Arasu et al. | |
| 8,321,648 B2 | 11/2012 | Condict | |
| 8,407,164 B2 | 3/2013 | Malik et al. | |
| 9,813,450 B1 * | 11/2017 | Wasiq | H04L 63/20 |
| 9,830,361 B1 * | 11/2017 | Varadarajan | G06F 40/295 |
| 10,110,634 B2 * | 10/2018 | Amar | H04L 67/535 |
| 10,303,797 B1 | 5/2019 | Menezes et al. | |
| 10,565,498 B1 | 2/2020 | Zhiyanov | |
| 11,238,507 B2 * | 2/2022 | Nagar | G06V 10/40 |

(Continued)

OTHER PUBLICATIONS

Yuting Song et al, "Metadata Similarity Calculation in Cross-Language Record Linkage based on Cross-Lingual Embedding Models", dated 2019, pp. 1-7.

(Continued)

*Primary Examiner* — Thuong Nguyen
(74) *Attorney, Agent, or Firm* — Robert C. Kowert; Kowert, Hood, Munyon, Rankin & Goetzel, P.C.

(57) ABSTRACT

One or more defect analysis iterations are performed on a collection of records. In a given iteration, a defect presence probability is obtained using a machine learning model for a record group. An estimated audit benefit is then assigned to the record group based at least partly on a defect remediation importance score of the record group. An indication of the estimated audit benefit of the record group is provided to an auditor. An audited defect status for the record group, generated by the auditor, is used to initiate one or more automated actions.

20 Claims, 10 Drawing Sheets

(56) References Cited

U.S. PATENT DOCUMENTS

| | | | |
|---|---|---|---|
| 2003/0046280 A1* | 3/2003 | Rotter | G16Z 99/00 |
| 2007/0143827 A1* | 6/2007 | Nicodemus | H04L 63/102 |
| | | | 726/2 |
| 2007/0239745 A1 | 10/2007 | Guerraz et al. | |
| 2008/0140699 A1* | 6/2008 | Jones | G06F 16/3325 |
| | | | 707/999.102 |
| 2009/0037440 A1 | 2/2009 | Will et al. | |
| 2016/0140519 A1* | 5/2016 | Trepca | G06N 7/005 |
| | | | 705/26.44 |
| 2018/0150724 A1 | 5/2018 | Brock | |
| 2020/0167905 A1* | 5/2020 | Bian | B25J 9/1697 |
| 2021/0056345 A1* | 2/2021 | Newman | G06F 16/9535 |
| 2021/0390424 A1* | 12/2021 | Vo | G06Q 30/0185 |
| 2022/0027652 A1* | 1/2022 | Bhaskar | G06V 30/40 |

OTHER PUBLICATIONS

William W. Cohen et al., "A Comparison of String Metrics for Matching Names and Records", dated 2003, pp. 1-6.
Yichao Lu et al, "A neural interlingua for multillingual machine translation", dated Oct. 16, 2018, pp. 1-9.
Ivan P. Fellegi et al, "A Theory for Record Linkage", dated Dec. 1969, vol. 64, No. 328, pp. 1183-1210.
Xiaonan Zhao et al., "A weakly supervised adaptive triplet loss for deep metric learning", pp. 1-4.
Ashish Vaswani et al, "Attention Is All You Need", dated 2017, 31st Conference on Neural Information Processing Systems, pp. 1-11.
Yoon Kim, "Character-Aware Neural Language Models", dated 2016, pp. 1-9.
Oyku Ozlem Cakal et al, "CLRL: Feature Engineering for Cross-Language Record Linkage", dated 2019, pp. 1-4.
Yoon Kim "Convolutional Neural Networks for Sentence Classification", dated Sep. 3, 2014, pp. 1-6.
Yuting Song et al, "Cross-Language Record Linkage based on Semantic Matching of Metadata", dated Mar. 2019, DBSJ Journal vol. 17 No.1, pp. 1-8.
Sidharth Mudgal et al, "Deep Learning for Entity Matching: A Design Space Exploration", dated Jun. 10-15, 2018, pp. 1-16.
Ahmed K. Elmagamid et al, "Duplicate Record Detection: A Survey", dated Jan. 2007, IEEE Transactions on knowledge and data engineering, vol. 19, No. 1, pp. 1-16.
Wang Ling et al, "Finding Function in Form: Compositional Character Models for Open Vocabulary Word Representation", dated May 23, 2016, pp. 1-11.
Melvin Johnson et al, "Google's Multilingual Neural Machine Translation System: Enabling Zero-Shot Translation", vol. 5. pp 339-351, dated 2017.
Vincenzo Di Cicco et al, "Interpreting Deep Learning Models for Entity Resolution: An Experience Report Using Lime", dated Jul. 5, 2019, pp. 1-4.
Holger Schwenk et al., "Learning Joint Multilingual Sentence Representations with Neural Machine Translation", dated Aug. 8, 2017, pp. 1-11.
Arijit Biswas et al., "MRNet-Product2Vec: A Multi-Task Recurrent Neural Network for product Embeddings", dated Sep. 21, 2017, pp. 1-5.
Orhan Firat et al, "Multi-Way, Multilingual Neural Machine Translation with a Shared Attention Mechanism", dated Jan. 6, 2016, pp. 1-10.
Adam Paszke et al, "PyTorch: An Imperative Style, High-Performance Deep Learning Library", 33rd Conference on Neural Information processing system, pp. 1-12.
Halbert L. Dunn et al, "Record Linkage", Dated May 10, 1946, pp. 1-5.
Adelene Y.I. Sim et al, "Record2Vec: Unsupervised Representation Learning for Structured Records", pp. 1-6.
Nils Reimers et al, "Sentence-BERT: Sentence Ebeddings using Siamese BERT-Networks", dated Aug. 27, 2019, pp. 1-11.
Hanna Kopcke et al, "Tailoring entity resolution for matching product offers", dated Mar. 26-30, 2012, pp. 1-12.
Sebastian Klenk et al, "The Normalized Compression Distance as a Distance Measure in Entity Identification", dated Apr. 8, 2010, pp. 1-17.
Edourd Grave et al, "Unsupervised Alignment of Embeddings with Wassertein Procrustes", dated May 29, 2018, pp. 1-11.
Jane Bromley, et al., "Signature Verification using a "Siamese" Time Delay Neural Network", AT&T Bell Laboratories, 1994, pp. 737-744.
Oriol Vinyals, et al., "Matching Networks for One Shot Learning", In Advances in Neural Information Processing Systems, 2016, pp. 1-12.
Jordan Burgess, et al., "One-Shot Learning in Discriminative Neural Networks", Workshop on Bayesian Deep Learning, NIPS 2016, pp. 1-3.
Anonymous, "Classification—TensorFlow", Retrieved from URL: https://www.tensorflow.org/versions/r0.10/api_docs/python/nn/classification#sigmoid_cross_entropy_with_logits on Feb. 15, 2017, pp. 1-5.
Wikipedia, "Keras", Retrieved from URL: https://en.wikipedia.org/wiki/Keras on Feb. 15, 2017, pp. 1-2.
Amazon Web Services, "Amazon Machine Learning—Developer Guide Version Latest", Updated Aug. 2, 2016, pp. 1-146.
Gregory Koch, et al., "Siamese Neural Networks for One-shot Image Recognition", In Proceeding of the 32nd International Conference on Machine Learning, JMLR: W & CP vol. 37, 2015, pp. 1-8.
Colah's Blog, "Understanding LSTM Networks", Posted on Aug. 27, 2015, pp. 1-22.
Sergei Dobroshinksy et al., "Integrate and deduplicate datasets using AWS Lake Formation FindMatches", AWS Big Data Blog, Retrieved from https://aws.amazon.com/blogs/big-data/integrate-and-deduplicate-datasets-using-aws-lake-formation-findmatches/, Feb. 5, 2020, pp. 1-24.
Russell Reas et al., "SuperPart: Supervised graph partitioning for record linkage", The 44th International Conference on the Very Large Data Bases, Proceedings of the VLDB Endowment, vol. 11, No. 5, Aug. 2018, pp. 1-10.
Hossein Esfandiari et al, "Parallel and Streaming Algorithms for K-Core Decomposition", dated Nov. 23, 2018, pp. 1-13.
Unknown "Graphstream—The Connected Components Algorithm", pp. 1-4.
Unknown "Kruskal's Algorithm", pp. 1-8.
Wissam Khaouid et al, "K-Core Decomposition of Large Networks on a Single PC", Proceedings of the VLDB Endowment, vol. 9, No. 1, dated 2015, pp. 1-11.
Unknown "Single-Linkage Clustering", pp. 1-6.
Wikipedia "Minimum Spanning Tree", pp. 1-15.
Yarin Gal et al, "A Theoretically Grounded Application of Dropout in Recurrent Neural Networks", (30th Conference on Neural information Processing Systems), pp. 1-9.
George Papadakis et al, "Comparative Analysis of Approximate Blocking Techniques for Entity Resolution", dated 2016, pp. 1-12.
Andrew Arnold et al, "A Comparative Study of Methods for Transductive Transfer Learning", pp. 1-11.
Jacob Devlin et al, "BERT: Pre-Training of Deep Bidirectional Transformers for Language Understanding", dated May 24, 2019, pp. 1-16.
Maithra Raghu et al, "Transfusion: Understanding Transfer Learning for Medical Imaging", dated 2019, pp. 1-11.
Marcus Rohrbach et al, "Transfer Learning in a Transductive setting", pp. 1-9.
Jiawei Wu et al, "Self-Supervised Dialogue Learning", dated Jun. 30, 2019, pp. 1-11.
Hong Wang et al, "Self-Supervised Learning for Contextualized Extractive Summarization", dated Jun. 11, 2019, pp. 1-7.
Wei Zhang et al, "AutoBlock: A Hands-off Blocking Framework for Entity Matching", dated Dec. 7, 2019. pp. 1-10.
U.S. Appl. No. 16/902,055, filed Jun. 15, 2020, Karim Bouyarmane.
U.S. Appl. No. 16/900,620, filed Jun. 12, 2020, Xianshun Chen.
U.S. Appl. No. 16/817,218, filed Mar. 12, 2020, Dmitry Vladimir Zhiyanov.

(56) References Cited

OTHER PUBLICATIONS

U.S. Appl. No. 16/808,162, filed Mar. 3, 2020, Xianshun Chen.

* cited by examiner

ITERATIVE MACHINE LEARNING BASED TECHNIQUES FOR VALUE-BASED DEFECT ANALYSIS IN LARGE DATA SETS

BACKGROUND

Records for many kinds of large-scale business applications are often stored in electronic form. For example, a global store may use electronic records containing text attributes (which can also include numeric attributes) as well as non-text attributes (such as images) to store information about millions of items that are available for sale, and publish at least some portions of the item descriptions contained in the electronic records to enable customers to select and purchase the items. Similarly, a large medical organization may store medical records for millions of customers. Although some organizations may attempt to standardize the manner in which information about entities is stored internally, such standardized approaches may not always succeed. For example, in environments in which a variety of vendors or product suppliers sell their items through a common re-seller, different vendors may use respective approaches towards describing items. Furthermore, the standardization approaches may differ from one organization to another, which may for example make it somewhat difficult to determine whether an item description at one store web site is necessarily referring to the same item as another differently-formatted item description at another web site.

The ability to resolve entity information-related ambiguities or defects (such as slightly different descriptions of the same entities, very similar descriptions of distinct entities, or incomplete/erroneous values in record attributes) may be extremely important for many organizations. For example, consider a scenario in which the same product is being sold on behalf of several different product suppliers via a particular store web-site, at which for each available product, a "details" web page is made available to potential customer. If different details pages are provided, based on the differences in the way that the product suppliers describe their product, this may lead to customer confusion, lowered customer satisfaction or even lower sales than may have been achieved had the products been clearly and unambiguously identified as being identical. Resolving such ambiguities, given various natural-language descriptions and/or non-text information about items originating at different sources, may present a non-trivial technical challenge, especially in environments in which the item catalog or inventory size is extremely large and tends to change rapidly.

Figure 1:
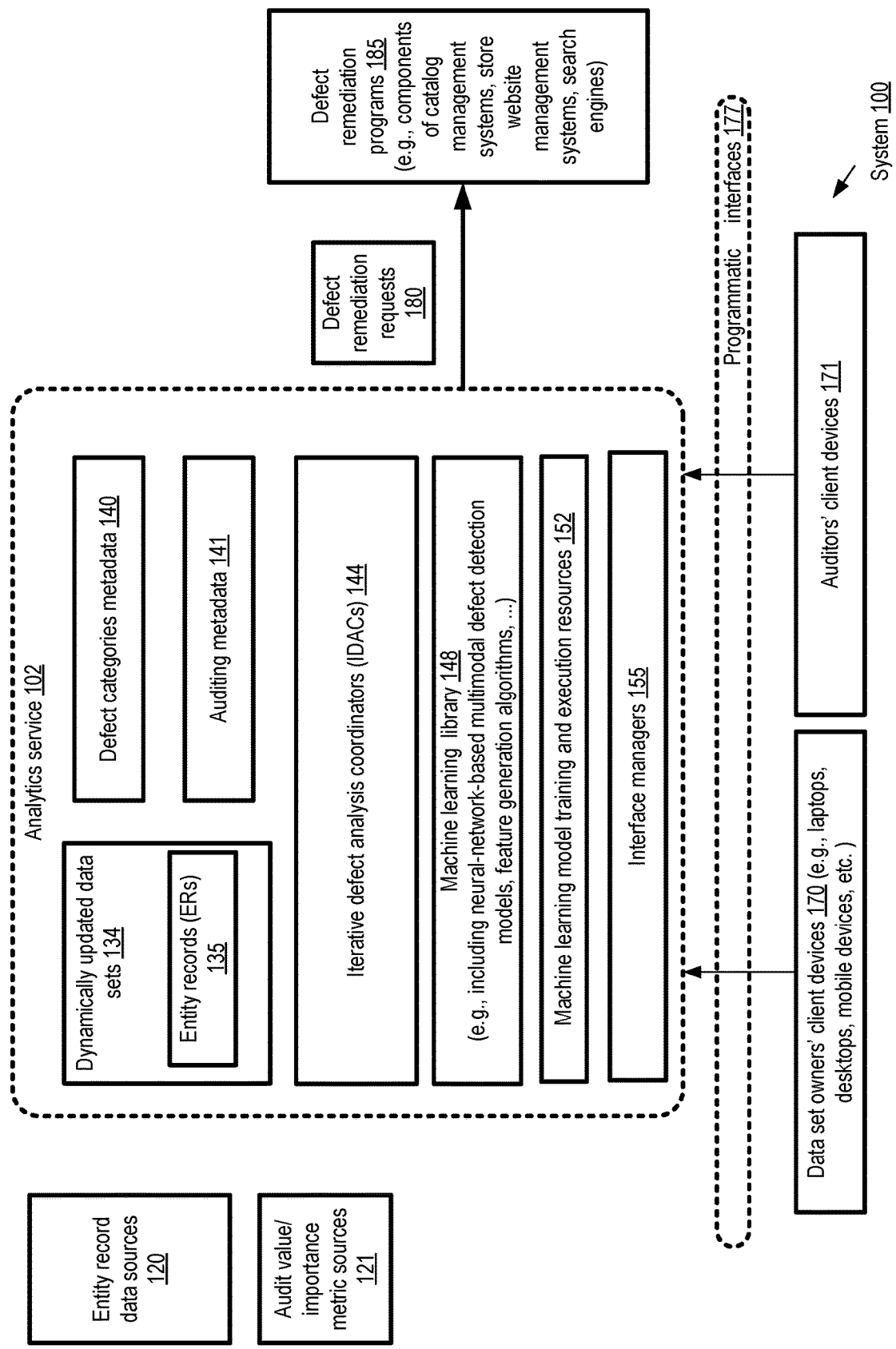
FIG. 1 illustrates an example system environment in which an iterative machine learning based technique for identifying and remediating defects within large data sets may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for a continuously improved machine learning-based technique for detecting defects (such as duplicate or error-containing records) within large data sets and initiating corresponding defect remediation actions when needed. Many data sets that are stored at cloud-based computing environments or other large storage systems, such as catalogs of electronic or physical stores, can contain billions of entity records generated by a variety of sources, and typically tend to grow rapidly. A given entity record is typically intended to represent a real-world item, object, or person, and can contain values of many different attributes (including both text attributes and non-text attributes in some cases such as images, videos, audio and the like). Some records may be incomplete or contain incorrect information (e.g., with missing attribute values, attribute values placed in the wrong fields, inaccurate descriptions of the real-world entity, etc.), and in some cases multiple records may actually refer to the same real-world entity. Such types of problems or errors may be referred to collectively as defects herein, and identifying and fixing such defects may represent a high priority for the organizations on whose behalf the entity records are stored. However, not all defects within a data set may be of equal importance or value: for example, in the case of a store catalog web site which could be used by thousands of customers to make purchases, fixing a defect in a record representing an item which is likely to be of interest to (approximately) ten thousand customers in a given time period may be much more important that fixing a defect in a record for an item which is likely to be of interest to at most a few customers. In order to address record defects effectively, it may thus be important not only to take the probability of defect occurrences into account, but also the relative importance of the defects.

In the proposed methodology, sophisticated multi-modal machine learning models are used to detect possible cases of defects within data sets—that is, to obtain predicted probabilities of the presence of defects within groups of one or more records of the data set. In some cases, a "correction" of a misidentified defect (e.g., merging two records which were wrongly characterized as being duplicates of one another) can itself result in more problems, so at least some of the predictions may need to be verified manually before remediation actions are taken. Instead of treating all potential defects identified using the machine learning models equally, the proposed technique utilizes data-driven metrics to rank the records with potential defects in order of application-specific importance or value, and then provides the ranked defect candidates to human auditors who can make the final decisions as to whether the candidates actually represent defects or not. As a result, at any given time, the auditors (often a scarce resource) can focus on those potential defects whose remediation is likely to be most beneficial to the organization on whose behalf the defect analysis is being performed. Output generated by the auditors is used for several purposes: e.g., to initiate automated remediation actions (such as merging duplicate records, correcting attribute values, etc.), as well as to generate labels for the candidate records or record groups, so that the additional labeled data can be used to re-train and improve the machine learning models. In some cases, the remediation actions initiated may include manual steps. As more iterations of defect probability predictions and manual auditing of the more valuable defects are performed over time, the quality of the defect probability predictions made by the machine learning models is improved, which in turn leads to more useful/valuable defect candidate record groups being identified and corrected more quickly. A continuous virtuous cycle of defect analysis and remediation, capable of addressing defects in larger and larger data sets despite varying record formats and schemas, is thus made possible by the proposed techniques.

As one skilled in the art will appreciate in light of this disclosure, certain embodiments may be capable of achieving various advantages, including some or all of the following: (a) substantially reducing the amount of computation, storage and networking resources required to detect and correct the kinds of data set defects which are of most importance for applications which operate on extremely large data sets, (b) improving the user experience of data auditors, e.g., by providing ranked representations of defect candidate records or record groups, thus enabling the auditors to avoid spending time and effort on identifying defect candidates on which they should focus, (c) improving the user experience of clients of web sites (including store web sites) which provide end users accesses to large catalogs, e.g., by providing better results for searches and comparisons, and/or (d) improving the user experience of vendors or sellers which wish to have items included within catalogs, e.g., by providing quick and accurate feedback about the existence of possible duplicates of their records.

According to some embodiments, a system may comprise one or more computing devices, e.g., of an analytics service of a provider network or cloud computing environment. The computing devices may include instructions that upon execution on or across the one or more computing devices cause the one or more computing devices to obtain an indication of one or more defect categories associated with a target data set of records. Individual records of the target data set may comprise a plurality of attributes including at least one text attribute and at least one non-text attribute (e.g., an image, video or audio) in various embodiments. The term "text attribute" as used herein is not limited to attributes that contain any particular subset of characters or symbols of any particular language, and refers generally to combinations of elements used to convey information in written form in languages or dialects used throughout the world (e.g., characters/symbols of language scripts, numerals, punctuation symbols, emoticons, emojis and the like).

The computing devices may perform one or more defect and analysis iterations with respect to the target data set in various embodiments. A given defect remediation iteration may comprise several phases or stages. One stage may comprise, in some embodiments, determining a respective defect presence probability for one or more defect categories with respect to an input record group comprising one or more records of the target data set. In at least some embodiments, such probabilities may be obtained with the help of one or more multi-modal machine learning models whose feature sets include a combination of one or more text features and one or more non-text features; as such, at least some parameters of the models may be learned using representations (such as vector embeddings) of both text attributes and non-text attributes.

Another stage or phase of the iteration may comprise assigning a respective estimated audit benefit corresponding to individual record groups whose defect presence probability corresponding to a given defect category exceeds a threshold. An estimated audit benefit assigned to a first input record group may, for example, be based at least in part on (a) the defect presence probability predicted by the machine learning model(s) for the given defect category and (b) an application-specific defect remediation value assigned to the first input record group with respect to the given defect category. The remediation value may be computed, for example, based on application-specific metrics such as page view counts of one or more of the records of the input record group over some recent time period, the number of search results in which one or more records of the input record group were included, transaction results indicating sales and/or returns of items represented by the records, and so on. Defect remediation values may also be referred to as defect remediation importance scores in various embodiments. In some embodiments, a remediation value may be computed on a per-record-group basis for each defect category; in other embodiments, the same remediation value may be assigned to several different record groups for a given defect category. In one embodiment, potential defects may be classified into severity levels based on semantic analysis, and the severity level of a defect may also be used to compute the remediation value. Consider a store catalog record example in which the correct contents of an attribute should be "set of 6", indicating that 6 items are packaged together. If that field incorrectly contains the string "set of 5"

instead of "set of 6", this may represent a relatively low-severity defect, whereas if the field incorrectly contains the string "set of 66", this may represent a higher-severity error.

The iteration of defect detection and remediation may also include a phase in which an audit candidate set is presented via one or more programmatic interfaces (e.g., web-based interfaces, graphical user interfaces or the like) to an auditor group comprising one or more auditors in various embodiments. The audit candidate set may indicate respective estimated audit benefits of one or more record groups, including at least some record groups whose respective defect presence probabilities for a given defect category exceeded the corresponding threshold. To help simplify the task of the auditors, in at least some embodiments the audit candidates may be presented in order of decreasing audit benefit, so that the auditors are able to easily identify the candidates whose analysis is likely to be most valuable. Thus, in such embodiments, the manner in which the audit candidates are arranged relative to one another may indicate the respective audit benefits; numerical representations of the respective audit benefits need not necessarily be provided. Auditors may also be referred to as annotators, labelers, or subject-matter experts in various embodiments. For a given audit candidate, an auditor (or multiple auditors) may examine the records indicated and make a decision as to whether a defect of a category indicated by the interface is present or absent (or if no decision can be made regarding the presence or absence of the defect) in various embodiments. In some cases, a consensus or voting protocol may be used, in which multiple auditors collectively come up with a decision regarding the defect status (e.g., "contains defect", "does not contain defect", "probably contains defect", "almost certainly contains defect", "probably does not contain defect", "almost certainly does not contain defect", "defect presence/absence cannot be ascertained" and the like) for the record group indicated in the audit candidate. The terms "audited defect status" or "defect status" may be used herein to refer to the result of the analysis performed by one or more auditors with respect to a record or a record group, which may include confirming that a defect is present, confirming that a defect is absent, or some intermediary decision indicating that a definitive conclusion regarding the presence/absence of the defect was not reached.

In at least some embodiments, also as part of the iteration of defect detection and remediation, one or more operations may be initiated based at least in part on the audit results obtained for a given audit candidate. For example, one or more automated remediation actions (such as merging records) may be initiated if a defect is confirmed by the audit in various embodiments. In addition, the audit results may be used to label the audit candidate record group, and the labeled records may be added to a training data set which can then be used to re-train and hence modify one or more of the machine learning models which were used to generate the probabilities of defect presence. In effect, a new version of a model, or an entirely new model, which can be used in subsequent iterations is obtained using the audit results. As such, the feedback from the auditors may drive the continual improvement of the model(s), and the results from the improved model(s) may continually be used to identify additional useful candidates for auditing.

In some embodiments, a single machine learning model may be used for predicting probabilities of defects of several different categories. In other embodiments, respective models may be used for each of several different defect categories. In some embodiments, a single team of auditors could be used to make decisions regarding several or all defect categories (for example, a list of ranked audit candidate record groups for more than one defect category may be provided to a given auditor of the team). In other embodiments, respective auditor teams may be used for different defect categories. In at least some embodiments, audit efficiency and/or expertise metrics may be collected from individual auditors with their permission, e.g., indicating how quickly different auditors are able to make decisions regarding various defect categories, how often an auditor has worked on defects of a particular category, and so on, and such metrics may be used to route audit candidates to different subsets of the available auditors.

According to at least some embodiments, portions of the contents of the audit candidate records presented to the auditors may be highlighted or otherwise visually differentiated, e.g., to indicate to the auditors that some highlighted portions may be more significant than others in making the defect status decision. In one embodiment, for example, one or more text tokens may be highlighted, shown in bold or in a different color than others. In some implementations, similar visual, audio and/or other cues may also be provided with respect to portions of images or videos that may be more useful for analysis than other portions.

At least some of the machine learning models (or subcomponents of the models) may initially produce defect presence scores as output, rather than defect presence probabilities per se. In order to assign audit benefits, such scores may be transformed or mapped into probabilities in some embodiments, e.g., using a smoothed isotonic regression algorithm or other techniques (such as Platt scaling) which may be incorporated into the models or executed as a separate component. Defect presence scores generated by a model, e.g., real numbers in the range 0.0 to 1.0, for different record groups may, in general, be used to rank the record groups relative to one another with respect to the likelihood that they contain defects, but may not represent numerical probabilities of the defects. For example, if a record pair RP1 is assigned a duplication-defect presence score of 0.8, and a different record RP2 is assigned a duplication-defect presence score of 0.5 this may not necessarily mean that RP1 has an 80% (predicted) probability of being an instance of a duplication defect while RP2 has a 50% (predicted) probability. In order to compute the audit benefit for a given record pair, the score generated for that pair may first be transformed into a probability in some embodiments, and then multiplied with a remediation value computed/estimated for that pair. If raw scores rather than probabilities were used, this may lead to cases where two record groups' computed audit benefits are not ranked appropriately relative to one another, since it is the combination of (a) the predicted probability of the presence of a defect and (b) the value of fixing such a defect if it exists that matters in such embodiments.

A variety of automated remediation actions may be performed in different embodiments in scenarios in which defects are confirmed within audit candidate record groups. Such automated remediation actions may include, for example, in addition to retraining of the machine learning models as discussed above, merging of duplicate records of record groups, un-merging/splitting of previously merged records due to an audit result indicating that two records are not duplicates, re-organization of at least a portion of a store catalog, or a correction of one or more attribute values of one or more records.

According to some embodiments, as suggested earlier, an iterative technique for defect detection and remediation of the kind introduced above may be performed at a network-accessible analytics service of a provider network, e.g., in response to one or more programmatic requests directed to the analytics service by its clients. Clients may utilize the programmatic interfaces supported by the analytics service to specify various preferences pertaining to the analysis, including for example specific text and/or non-text features to be generated for entity record pairs, algorithms to be used to generate one or more features, hyper-parameters of the machine learning models (such as defect probability thresholds to be used to select audit candidates, learning rates, etc.), techniques to be used to compute audit benefits, and so on. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which an iterative machine learning based technique for identifying and remediating defects within large data sets may be implemented, according to at least some embodiments. As shown, system 100 comprises artifacts and resources of an analytics service 102, including dynamically updated data sets 134 comprising entity records (ERs) 135 among which defects of one or more categories are to be detected, defect categories metadata 140, auditing metadata 141, iterative defect analysis coordinators (IDACs) 144, machine learning library 148, machine learning model training and execution resources 152, and interface managers 155 in the depicted embodiment. The analytics service 102 may also be referred to as an artificial intelligence service or a machine learning service in some embodiments.

A set of programmatic interfaces 177 may be provided by the analytics service 102 in the depicted embodiment, such as web-based consoles, command-line tools, application programming interfaces (APIs), graphical user interfaces and the like for at least two types of clients. Data set owners who wish to have their data sets checked for defects may use a subset of the programmatic interfaces 177 to submit defect analysis requests, e.g., from a variety of data set owners' client devices 170 (such as desktops, laptops, mobile devices such as phones and the like) and receive corresponding responses in various embodiments. As part of the iterative defect detection procedure implemented at the analytics service 102 for the data set owners, candidate entity records (or record groups) for which the presence/absence of defects is to be confirmed may be presented to one or more pools of auditors via another subset of programmatic interfaces 177 in some embodiments. The auditors, representing a second type of client of the analytics service, may examine details of the candidate entity records and provide audit results for the candidates from a set of auditors' client devices 171 (which may also include desktops, laptops, mobile devices etc.). One or more interface managers 155, implemented at one or more computing devices, may be responsible for the presentation of data (such as audit candidate records) and results to clients of analytics service 102 via the programmatic interfaces 177, receiving and performing initial processing of messages/requests sent by clients, and so on. In at least one embodiment, portions of the content of the audit record which are likely to be of greater help in making decisions about the presence/absence of defects may be highlighted when the records are presented to the auditors.

A data set owner may specify one or more entity record data sources 120 from which the ERs 135 to be examined for defects are to be obtained in various embodiments. Individual ERs 135 may comprise text attributes (e.g., fields such as titles, descriptions, etc.) as well as one or more non-text attributes (such as images, videos, audios and the like) in some embodiments. The entity record data sources 120 may, for example, include databases storing catalog records of a physical or electronic store, patient record repositories of health care organizations, personnel or customer records of various business or government organizations, and so on. Values for the attributes of ERs may be populated by a wide variety of real-world data submitters in different embodiments. For example, in the case of a store catalog, numerous sellers around the world may submit records indicating items they wish to sell via the store's web sites, and not all the sellers may populate the record attribute values consistently. Some data sets 134 may comprise very large numbers (e.g., millions or billions) of entity records, and may experience high rates of growth. In some cases, the schema (the set of attributes) of some of the entity records of a given data set which is to be examined for defects may differ from the schema of other records of the same data set—e.g., different countries or regions may provide respective sets of fields which have to be filled out for medical records. ER schemas within a given data set may also evolve over time—e.g., new fields may be added to a catalog item submission form from time to time, or existing fields may be removed.

Data set owners may be interested in detecting and remediating defects of several different categories within their respective dynamically updated data sets 134 in various embodiments. Some data set owners may, for example, be most interested in identifying duplicate records and merging them, others may be most interested in identifying internal inconsistencies in the records and resolving the inconsistencies if possible, and so on. Defect categories metadata 140 may include definitions/descriptors of the kinds of defects that are to be detected on behalf of the data set owners at the analytics service, as well as additional information such as defect severity level classification rules and the like in some embodiments. In at least some embodiments, at least a subset of the defect categories metadata 140 may be provided via programmatic interfaces 177. In one embodiment, the analytics service 102 may indicate a default list of supported defect types to data set owners via the programmatic interfaces 177, and the data set owners may select defect categories from the default list if desired instead of or in addition to providing custom defect category metadata.

Auditing metadata 141 may include information about pools of available auditors to whom candidate records or record groups can be presented in the depicted embodiment. In some embodiments, different pools of auditors may be used for respective kinds of defects or for respective types of entity records—some auditors may be more skilled at detecting defects within medical records than item catalog records, others may be more skilled at detecting duplicates than detecting intra-record inconsistencies, and so on. In at least one embodiments, metrics such as the average time taken per defect analysis audit by individual auditors, the average time between the presentation of an audit candidate record group and the time that an auditor starts examining the candidate record group and so on may be collected by the analytics service after obtaining the needed permissions. Auditing metadata 141 may include information about auditor skill sets and preferences as well as such audit-related metrics in some embodiments. In at least some embodiments, auditing metadata 141 may be used to route different audit candidate record groups to the auditors who are likely to be most effective at auditing the record groups. For example, a determination may be made, based at least in part on analysis of respective sets of auditing metadata of a first set of auditors and a second set of auditors, that a first audit candidate group is to be presented to the first set of auditors, and a second audit candidate group is to be presented to the second set of auditors.

Iterative defect analysis coordinators (IDACs) 144, implemented using software and/or hardware components of one or more computing devices, may be responsible for orchestrating a multi-phase iterative procedure for identifying and (in at least some cases) remediating defects of various defect categories within data sets 134 on behalf of data set owners in the depicted embodiment. Details of the kinds of multi-phase procedures which may be implemented in some embodiments are provided below. The IDACs may obtain an indication of one or more defect categories associated with a target data set 134 of ERs 135, e.g., via programmatic interfaces 177, and initiate a plurality of defect analysis and remediation iterations. A given iteration may comprise determining, using one or more multi-modal machine learning models implementing algorithms from machine learning library 148, a respective defect presence probability corresponding to one or more defect categories and an input record group comprising one or more records of the target data set in various embodiments. The model(s) may be trained and run using resources 152 (e.g., including various physical and/or virtual machines) in the depicted embodiment. The models may be described as multi-modal in some embodiments because they may analyze and learn from feature sets which represent several different content types of input records, including text, image, video and the like. In at least one embodiment, neural network models which comprise mode-specific subnetworks, such as text analysis subnetworks, image analysis subnetworks and the like may be used. The machine learning library 148 may also include one or more sophisticated feature generation algorithms in some embodiments, which may be used to generate vector or tensor representations of various text and non-text attributes of the entity records. In some embodiments, for a given target data set and a given defect category, a set of record groups (each including one or more ERs) may be identified and provided as input to a model, and a respective defect presence probability may be obtained from the model. For some defect categories (such as duplicates) pairs of ERs may be passed as input to a model, while for other defect categories (such as internal inconsistency checking), each record group may comprise a single ER. In some embodiments, respective models may be used for each of several defect categories; in other embodiments, a single model may be used to predict presence of several different defect categories. In some implementations, a model may first generate a defect presence score for a given record group, and the score may then be transformed or mapped into a probability using an algorithm such as an isotonic regression algorithm or Platt scaling.

In at least some embodiments, after the defect presence probabilities have been obtained, the next phase of the iterative procedure may comprise an IDAC 144 assigning a respective estimated audit benefit to record groups whose defect presence probability for a defect category exceeds a threshold. Such an estimated audit benefit assigned to a given record group may, for example, be based at least in part on (a) the defect presence probability and (b) an application-dependent defect remediation value in various embodiments. The application-dependent defect remediation value may be obtained or computed, for example, using metrics accessible from one or more audit value/importance metric sources 121 in the depicted embodiment. For a store catalog use case, for example, a defect remediation value for a potentially duplicated pair of records may be based on such metrics as the number of page views of the records on the store's web site during the previous 30-day period, or the number of times one or both of the records were included in a search result of the store's web site. In some cases, the audit value/importance metric sources may include records of sales and/or returns of catalog items, positive or negative reviews of products represented by ERs, and so on. In some embodiments, factors such as the estimated difficulty of auditing a given record group for defects or the estimated time required for such auditing may also be used to compute the estimated audit benefit. Information about the skills of the available auditors may also be used to determine the estimated audit benefit in one embodiments.

Based on their estimated audit benefits, one or more audit candidate sets or groups, each comprising one or more record groups, may be provided to a group of one or more auditors via programmatic interfaces 177 in various embodiments in the next phase of the iteration. In at least some implementations, respective estimated audit benefits of the record groups may also be provided, or an indication of the relative estimated audit benefits may be provided by presenting the record groups in order of decreasing estimated benefits.

Audit results may be obtained for at least some of the audit candidate sets via programmatic interfaces 177 in various embodiments as part of the iteration. Such results may be provided in a variety of formats in different embodiments. For example, in some cases and for some types of defects, an auditor may provide a binary result, with a "yes" indicating that a defect of the defect type was confirmed in the record group, and a "no" indicating that absence of any defect of the defect type was confirmed in the record group. For other defect types, one of a set of non-binary audit results (such as "highly likely that defect is present", "likely that defect is present", etc.) may be provided. In some cases, the auditor may provide an array of results, e.g., one per attribute in a scenario in which presence of erroneous values/data is to be detected in different attributes. In some embodiments, a given auditor may provide audited defect status for several different defect categories with respect to a given audit candidate. The audit results may trigger several types of operations in different embodiments. In at least one embodiment, the audit results may be used to label additional record groups for inclusion in a training data set of one or more of the machine learning models, and the models may be retrained and thereby modified/improved. In some embodiments, automated defect remediation workflows (such as workflows to merge duplicate records or obtain missing values for attributes) may be initiated based on audit results, e.g., in addition to or instead of modifying/retraining the model(s). For example, such automated workflows may be implemented at one or more defect remediation programs 185 in response to defect remediation requests 180 transmitted from the analytics service 102. Examples of defect remediation programs may include, among others, components of catalog management systems, store website management systems, search engines and the like. The improved models may then be used to generate the defect presence probabilities for various record groups in the next iteration of defect analysis and remediation in various embodiments. Over time, the models may produce better predictions regarding defects, and the data sets being analyzed may be cleansed of more and more defects, thereby improving the overall quality of the dynamically updated data sets 134.

Example Defect Categories

Figure 2:
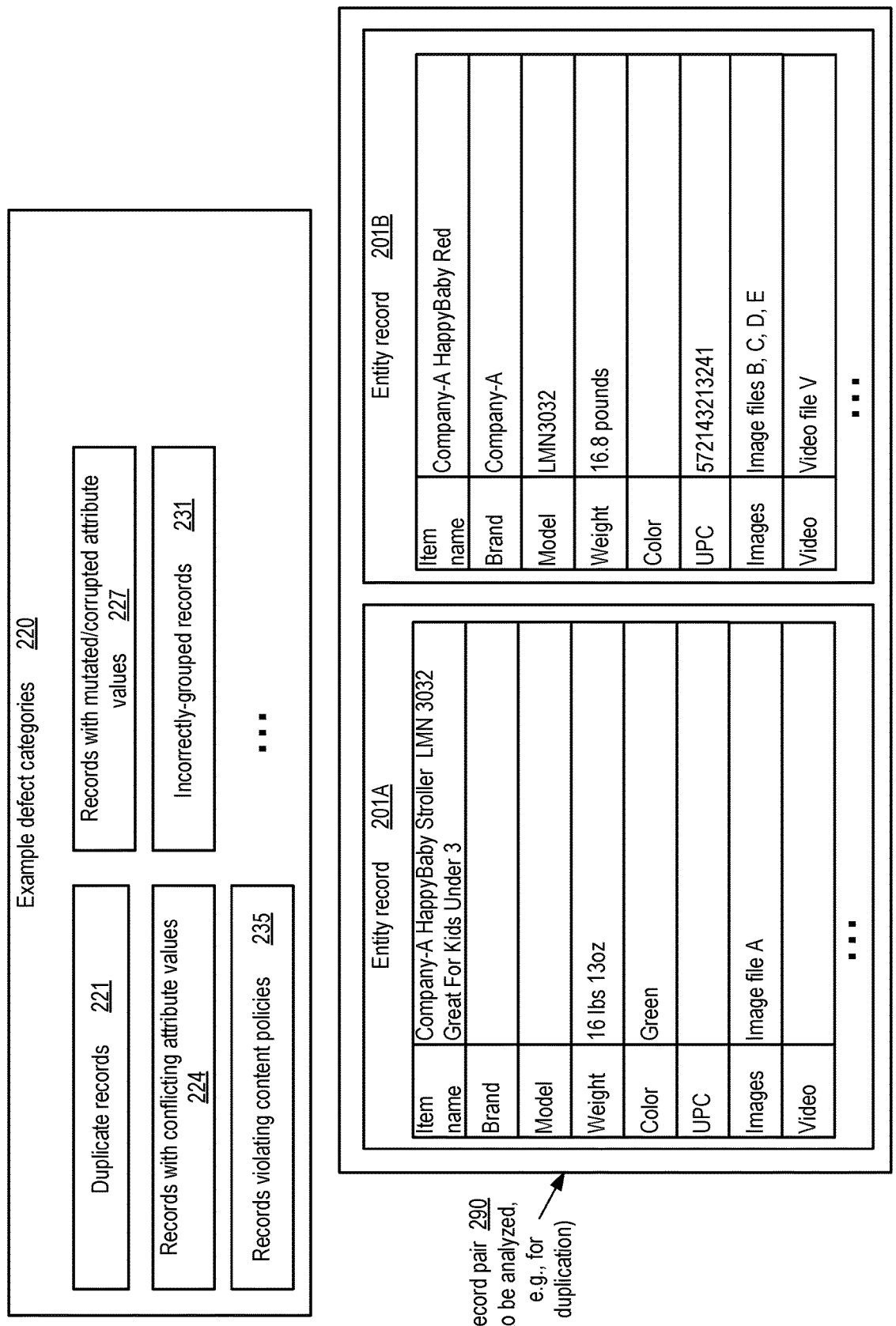
FIG. 2 illustrates example categories of data set defects and an example pair of records which may have to be analyzed for duplication, according to at least some embodiments.

FIG. 2 illustrates example categories of data set defects and an example pair of records which may have to be analyzed for duplication, according to at least some embodiments. A shown, example defect categories 220 whose instances may be detected using the iterative approach introduced above may include, among others, duplicate records 221, records with conflicting attribute values 224, records with mutated/corrupted attribute values 227, incorrectly-grouped, incorrectly-grouped records 231, and/or records violating content policies 235 in the depicted embodiment.

Two entity records may be said to be duplicates of each other if they refer to the same real-world entity, and identifying such duplicates may be helpful in many problem domains, including catalog management of store web sites, customer relationship management, and so on. In examples of conflicting attributes defects 224, different attributes of a given record may include conflicting information, which may in turn lead to errors such as inaccurate search results, inaccurate classifications of the records. In some cases, during the process of populating the attributes or fields of a record and/or processing and storing the records, one or more of its attribute fields may be inadvertently changed, and may thus no longer convey the information that it was originally intended to convey; this type of defect may be referred to as mutated/corrupted attribute values 227 or as erroneous attribute values. Often, records of a data set may be clustered into groups of similar records, or groups of apparently duplicated records, but this grouping may have been erroneous (e.g., due to a flaw in a record matching algorithm); such cases may represent examples of incorrectly-grouped records 231. For some types of data sets, privacy and/or other regulations or policies may be enforced, so that for example records which contain unencrypted personally identifiable information (PII) are considered a policy violation. Records which violate content policies 235 may represent another defect category in some embodiments. In some embodiments, respective machine learning models may be trained for each defect category and used to generate predicted probabilities of the presence of examples of the defect categories as part of the iterative methodology introduced above. In other embodiments, a single machine learning model may be used to predict probabilities of the presence of instances of more than one defect type.

An example entity record pair 290 is also shown in FIG. 2 to illustrate some aspects of the problems associated with detecting defects such as duplicates. Each of the entity records represent an item of a store catalog, and the contents of the two records may have been provided by distinct content providers/sources (such as respective vendors or sellers) to the store organization at which the entity records are stored and whose web site may be used to sell the items of the catalog.

Each record has several text fields or attributes, including an item name field, a brand field, a model field, a weight field, a color field and a UPC (Universal Product Code) field in the depicted example, as well as an images field and a video field. The providers of the record content may be advised to provide data for all the fields applicable to their items, but they may not be required to do so. Furthermore, they may provide any desired strings and/or numbers (with few or no constraints on the data provided, except, for example, constraints on the maximum length and/or the language used) for at least some of the text fields. Some record content providers may put several types of information which could potentially be distributed among other fields into a single field, leaving the other fields blank, or duplicating information among several fields.

Both entity records 201A and 201B represent baby strollers in the depicted example. In the source entity record, the text token sequence "Company-A HappyBaby Stroller LMN 3032 Great For Kids Under 3" has been provided for the item name field, the text token sequence "16 lbs 13 oz" has been provided for the weight field, and the text token "Green" has been provided for the color field, with other text fields left empty. In the target entity record, the text token sequence "Company-A HappyBaby Red" has been provided for the item name field, the text token "Company-A" has also been provided for the brand field, the text token "LMN3032" has been provided for the model field, the text token sequence "16.8 pounds" has been provided for the weight field, and the text token "572142213241" has been provided for the UPC field, with other text fields left empty. Entity record 201A comprises a single image file A, while entity record 201B comprises a plurality of image files B, C, D and E. Entity record 201B includes a video file V, while entity record 201A does not include a video file.

A human may be able to look at the values of the various attributes of the two entity records and come to the following conclusion: the two records probably refer to differently-colored (green versus red) strollers of the same brand and model, and hence represent distinct real-world entities. However, a conventional machine learning model used for detecting similarities (which may for example compute the distance between multi-dimensional embeddings of the tokens of each of the records considered singly) may be challenged in reaching the same conclusion for a number of reasons. The model may be able to detect that the word "green" exists in one record and "red" exists in the other record, but the encodings of these two words learned by the model may not necessarily indicate that these are both examples of the logical construct "color" (especially because the word "red" is not in the color field). In addition, several tokens exist in one of the records but not in the other, so the fact that "red" doesn't exist in one of the records and "green" doesn't exist in the other may not necessarily indicate that these two tokens represent the most import distinguishing features of the two records. The different ways in which the weight is expressed in the two records may also be open to misinterpretation. Different weight-related tokens ("lbs" and "pounds") actually refer to the same unit, so this represents a case where the existence of different words in the records should not lead towards a conclusion that the two entities represent differ from one another. Models that take images or videos into account may be able to help determine whether the two records are duplicates, but even this may be complicated because of the different number of images in the two records, and the absence of a video in one of the records. Even a multi-modal model which takes both text and non-text (in this example, image and video) attributes into account may not be able to make a conclusive decision regarding whether the records are duplicates in at least some embodiments, thus necessitating the use of human auditors.

Iterative Workflow for Defect Analysis

Figure 3:
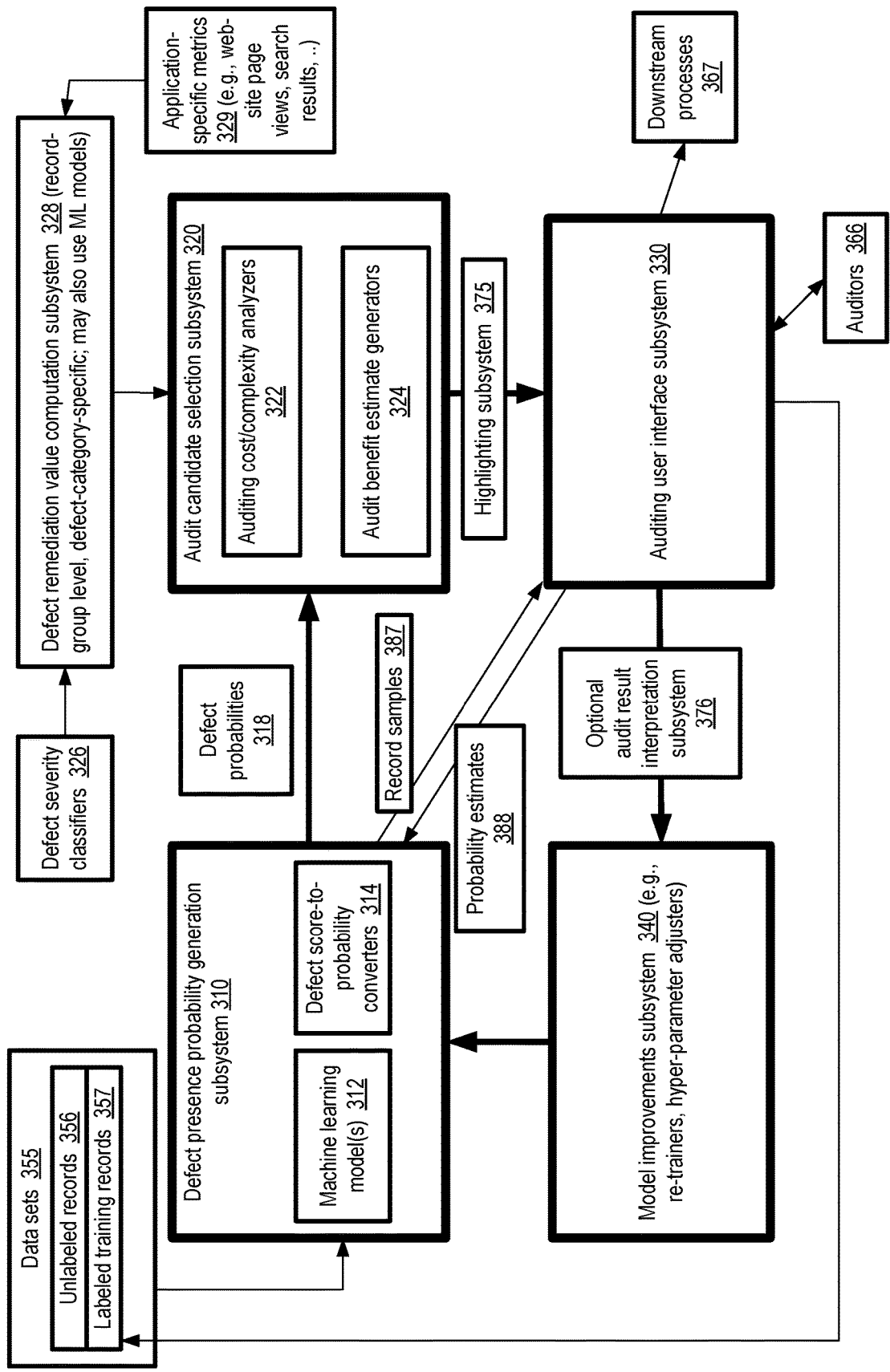
FIG. 3 illustrates an example high-level workflow for iterative defect detection and remediation which may be implemented for large data sets, according to at least some embodiments.

FIG. 3 illustrates an example high-level workflow for iterative defect detection and remediation which may be implemented for large data sets, according to at least some embodiments. Four major stages of the workflow are represented by defect presence probability generation subsystem 310, audit candidate selection subsystem 320, auditing user interface subsystem 330 and model improvements subsystem 340 in the depicted embodiment.

In the defect presence probability generation subsystem 310, one or more machine learning models 312 may be trained using labeled training records 357 of data sets 355 to generate scores indicative of the presence of various types of defects within a given input record group in the depicted embodiment. The training may be repeated over time, e.g., as new labeled training data becomes available; various trained versions of the models may be used to generate defect presence scores for unlabeled records 356 of the data sets 355. The defect scores for various individual records or record groups (e.g., record pairs in scenarios in which duplicates are to be detected) may be transformed into defect presence probabilities using one or more defect score-to-probability converters 314 in the depicted embodiment. In some embodiments, smoothed isotonic regression algorithms and/or Platt scaling may be used for the conversion. In the depicted embodiment, record samples 387 corresponding to various levels or ranges of defect scores may be provided to auditors via auditing user interface subsystem 330, and probability estimates 388 generated for the samples may be used to determine the parameters of the defect score-to-probability converters 314. The defect probabilities 318 computed for various record groups during a given iteration may be provided, along with the record groups, to audit candidate selection subsystem 320. In some embodiments, only a subset of record groups whose defect probabilities exceed a selected threshold (where the threshold is a hyper-parameter of the workflow) may be transmitted to the audit candidate selection subsystem 320.

At the audit candidate selection subsystem, the defect probabilities 318 may be used together with defect remediation value information obtained from defect remediation value computation subsystem 328 to identify and/or rank record groups which are to be provided to auditors for evaluation in the depicted embodiment. For a given record group comprising one or more records, one or more application-specific metrics 329 (e.g., counts of page views during recent time intervals, counts of search results in which the records of the group were included, etc.) may be used to determine the remediation value (the value of verifying if the defect exists, and resolving the defect if the presence of the defect presence is verified). For example, in the duplicate detection scenario, a pair of records which has collectively had 50000 page views at a store catalog website over a recent time period T may be assigned a higher defect remediation value than a pair of records which has collectively had only 1000 page views over the same recent time period, with the underlying assumption that page views are correlated with possible sales and hence with business value from the perspective of the owner of the store. In some embodiments, distinct remediation values may be assigned for each record group. In other embodiments, remediation values may be assigned based on defect severity (obtained from defect severity classifiers 326). If a potential defect represents a relatively small error (such as a mistaken attribute value indicating that an item weighs 260 grams when it actually weighs 250 grams), its severity may be lower than if the potential defect represents a much larger error (such as a mistaken attribute value indicating that an item weighs 2500 grams when it actually weighs 250 grams). In some embodiments, the remediation value may be dependent at least in part on the particular defect category being considered. For example, for some data set owners, duplicate records may be much more important to fix (e.g., by merging true duplicates) than incomplete attribute values, so higher remediation values may be assigned for duplication record groups than for incomplete attribute records. In some embodiments, one or more machine learning models may be used to generate the defect remediation values, using application-specific metrics 329 and/or defect severities 326 as input to the models.

In one simple implementation, an overall audit benefit for a given record group may be estimated as the product of the defect probability 318 of the group and the remediation value. In such an implementation, all other factors being equal, the estimated advantage of performing the audit for a record group RG1 with a defect probability of 0.9 may be 1.5 times the estimated advantage of performing the audit for a record group RG2 with a defect probability of 0.6 for the same type of defect. Also, in such an implementation, all other factors being equal, the estimated advantage of performing the audit for a record group RG3 with a remediation value of 0.75 (e.g., on a scale from 0 to 1) may be 1.5 times the estimated advantage of performing the audit for a record group RG4 with a defect probability of 0.5. However, if the defect probability for a record group RG5 is 0.9 and the remediation value is 0.6, while the defect probability for record group RG6 is 0.6 and the remediation value is 0.75, RG5's audit benefit would be estimated as (0.9×0.6) or 0.54, while RG6's audit benefit would be estimated as (0.6×0.75) or 0.45, so auditing RG5 would be considered more advantageous. More complex functions than simple multiplications may be used to determine the overall audit benefits in various embodiments. In some embodiments, for a given record group, respective defect presence probabilities for multiple defect categories may be predicted, and corresponding defect remediation values for the different defect categories may be used in combination to determine an overall audit benefit for the record group.

In at least some embodiments, along with the defect remediation values and the probabilities of defect presence, one or more auditing cost/complexity analyzers 322 may also contribute to overall audit benefit estimates produced for various record groups by audit benefit estimate generators. The auditing cost/complexity analyzers 322 may, for example, examine the skill sets and efficiency metrics as well other auditing metadata (similar to auditing metadata 141 of FIG. 1) of the currently available pool of auditors, and estimate how long it might take to obtain audit results for various record groups. The overall audit benefit estimates computed for various record groups for which defect probabilities 318 were obtained may be used to create ordered lists of record groups (e.g., arranged in decreasing order to estimated audit benefits) and provided via auditing user interface subsystem 330 to one or more auditors 366. In some embodiments, portions of the content of the records to be audited may be highlighted, e.g., at highlighting subsystem 375 before the information is presented to the auditors. Highlights or other cues may help direct the auditors' attention to attributes or portions of attributes which may be more helpful in determining whether a defect actually exists in the record group. Examples of such visual cues are discussed below in further detail.

After examining the record groups, e.g., in order of decreasing audit benefit estimates, respective audit results may be generated by the auditors 366 for at least some of the record groups presented in the depicted embodiment via auditing user interface subsystem 330. In some embodiments, the audit results may comprise labels for the record groups, which may be used to expand the labeled training records 357 and retrain the machine learning models by model improvements subsystem 340. In at least one embodiment, at least some of the audit results may be interpreted or transformed, e.g., by optional audit result interpretation subsystem 376, before they can be fed back to improve the machine learning models. For example, categorical audit results may be transformed to numeric audit results at subsystem 376, or some audit results may be discarded if the results do not have high confidence levels (provided by auditors 366) associated with them. In addition to re-training, in at least some embodiments other types of improvements may be initiated based on the audit results, such as modifying hyper-parameters of the models. The feedback from the auditors may thus be used to continuously improve the model(s) 312, and the improved versions of the model(s) 312 may be used to provide additional audit candidates as the data sets 355 grow. Even in a scenario in which the total number of unlabeled records 356 does not grow during an iteration, the improved models may nevertheless be used to identify additional audit candidates for the next round of auditing in various embodiments. In at least some embodiments, at least some audit results may also be sent to one or more downstream processes 367 and used to initiate automated defect remediation operations such as merging/splitting records, correction erroneous attribute values, and the like.

Example Machine Learning Model

Figure 4:
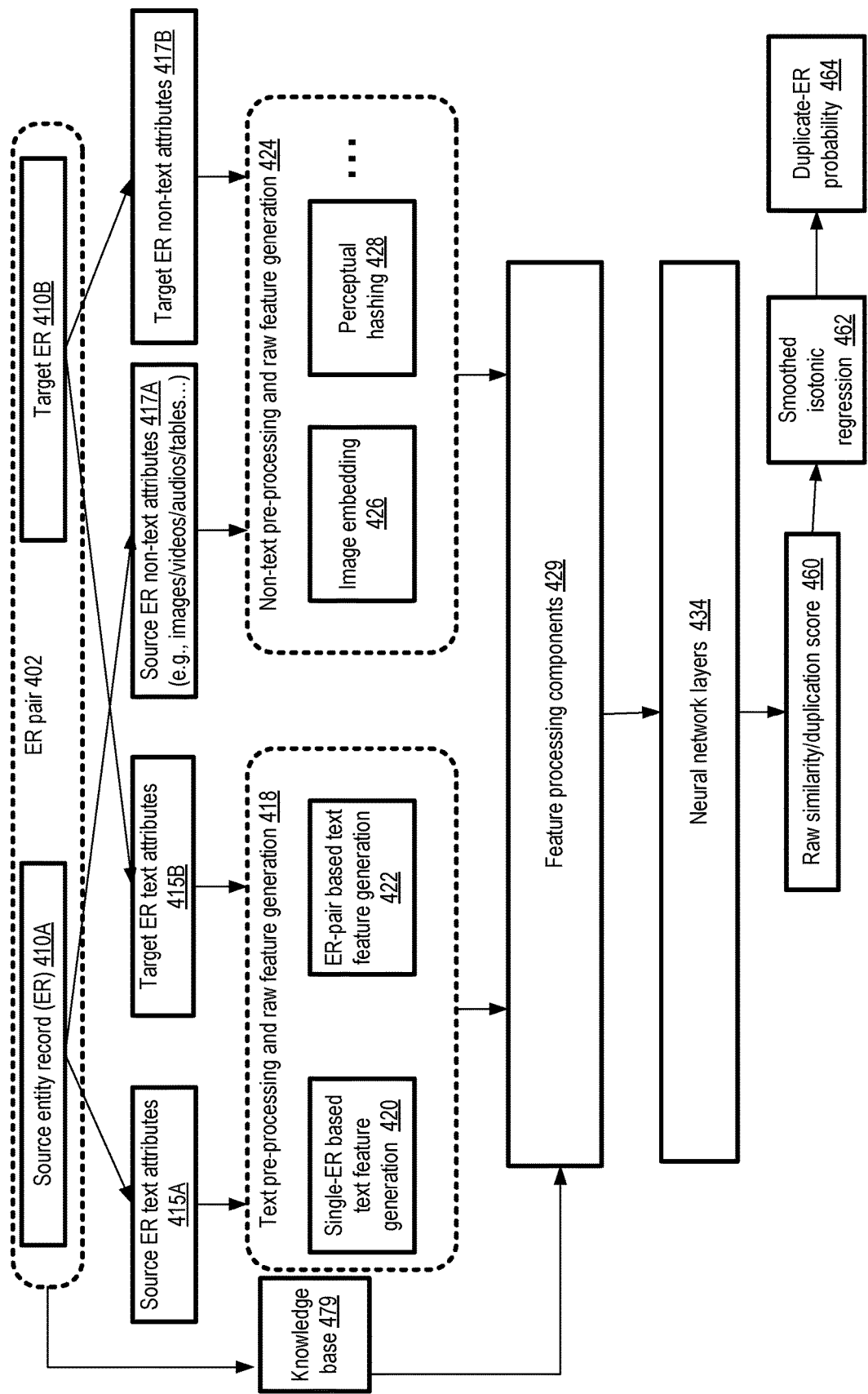
FIG. 4 illustrates aspects of an example multi-modal machine learning model which may be used for generating scores and associated probabilities for the presence of duplicate records, according to at least some embodiments.

In some embodiments, as mentioned above, machine learning models that take several different types of content into account when generating defect scores, and may therefore be referred to as multi-modal models, may be used in the iterative defect analysis technique introduced herein. FIG. 4 illustrates aspects of an example multi-modal machine learning model which may be used for generating scores and associated probabilities for the presence of duplicate records, according to at least some embodiments. A given entity record pair ER pair 402 comprises source ER 410A and target ER 410B. The source ER 410A comprises one or more text attributes 415A and one or more non-text attributes 417A (e.g., attributes or fields comprising images, videos, audios and the like). The target ER 410B comprises one or more text attributes 415B and one or more non-text attributes 417B.

Features based on the text attributes of both ERs may be generated in text pre-processing and raw feature generation stage 418 of the model, while features based on the non-text attributes of both ERs may be generated in a non-text pre-processing and raw feature generation stage 324 in the depicted embodiment. The text pre-processing and raw feature generation stage 418 may in turn comprise single-ER based text feature generation 420 and ER-pair based text feature generation 422. In at least some embodiments, individual text tokens (e.g., words) may first be extracted from the text attributes of each ER of the pair. Token-level features may be generated for individual ones of the tokens, with a first group of token-level features being created for a given token based on examining just a single ER as part of the single-ER based text feature generation 420. Then, a second group of token-level features may be created for the given token being created based on examining the other ER of the ER pair, as part of the ER-pair based text feature generation 422. This second group of token-level features may be referred to as pairwise-text-analysis-result features in at least some embodiments, as they are generated using pairwise analysis of text content of the ERs. In some embodiments, values of such ER-pair based text features for a given text token of a given ER of an ER pair 402 may be based on whether or not the token appears in both ERs of the ER pair 402, or may be based on similarity metrics (e.g., cosine similarity values between token embeddings) computed between the given text token and the text tokens of the other ER of the pair, and so on. In at least some embodiments, ER-pair based text feature generation 422 may not be dependent on (or be performed after) single-ER based text feature generation.

The non-text pre-processing and feature generation stage 424 may comprise several different sub-computations in the depicted embodiment, depending for example of the kinds of non-text attributes present in the ER pair 402 and the number of each type of non-text attributes present. In a simple case where each ER comprises just one image, for example, encodings of the images from both ERs 410 may be generated to produce one set of features in computations using selected image embedding technique 426, and some number of perceptual hash values (e.g., one perceptual hash result for a given image for each of several color channels) may be obtained using a selected set of perceptual hash algorithms 428.

The text feature set and the non-text feature set may both be provided as input to additional feature processing components 429 in the depicted embodiment. In some embodiments, a set of rules stored in a knowledge base 479 may be used to produce additional features provided as input to feature processing components. Such knowledge base rules may have been developed over time based on analysis of audited defects, for example, and may represent insights about the interpretation of specific application-specific terms in different attributes. Such vector or tensor representations may be passed to one or more neural network layers 434 in the depicted embodiment.

A multidimensional vector or tensor representation of at least a subset of the combination of text, non-text and knowledge base-derived features may be generated as output by the feature processing components 429 in the depicted embodiment. Any combination of a wide variety of neural networks may be used in different embodiments, including for example convolutional neural networks, recurrent neural networks such as long short-term memory units (LSTMs), transformers and the like. In some embodiments, one or more symmetric or mirrored neural sub-networks may be used. In some embodiments, the neural network layers 434 may comprise a text analysis subnetwork and one or more non-text analysis subnetworks. The text analysis subnetwork may, for example, comprise a token-level layer and an attribute-level layer. In one embodiment, the neural network layers may include some number of fully connected layers and/or one or more other types of feedforward layers.

A predicted raw similarity/duplication score 460 may be generated by the neural network layers 434 for the ER pair 402 in the depicted embodiment. Smoothed isotonic regression 462 may be used to generate probabilities 464 from the raw scores 460 in various embodiments.

While models similar to the example model shown in FIG. 4 may be used for duplicate analysis, conceptually similar multi-modal models may be used for generating probabilities of the presence of other types of defects (other defect types discussed in the context of FIG. 2) in various embodiments. In some embodiments, machine learning models that do not use neural networks, such as various types of regression or decision tree based models, may be used. In at least one embodiment, a machine learning model that only takes one type of content (such as text alone, or images alone) may also or instead be used to generate defect probabilities; as such, multi-modal models are not a requirement for the iterative technique introduced herein.

Example Interfaces

Figure 5:
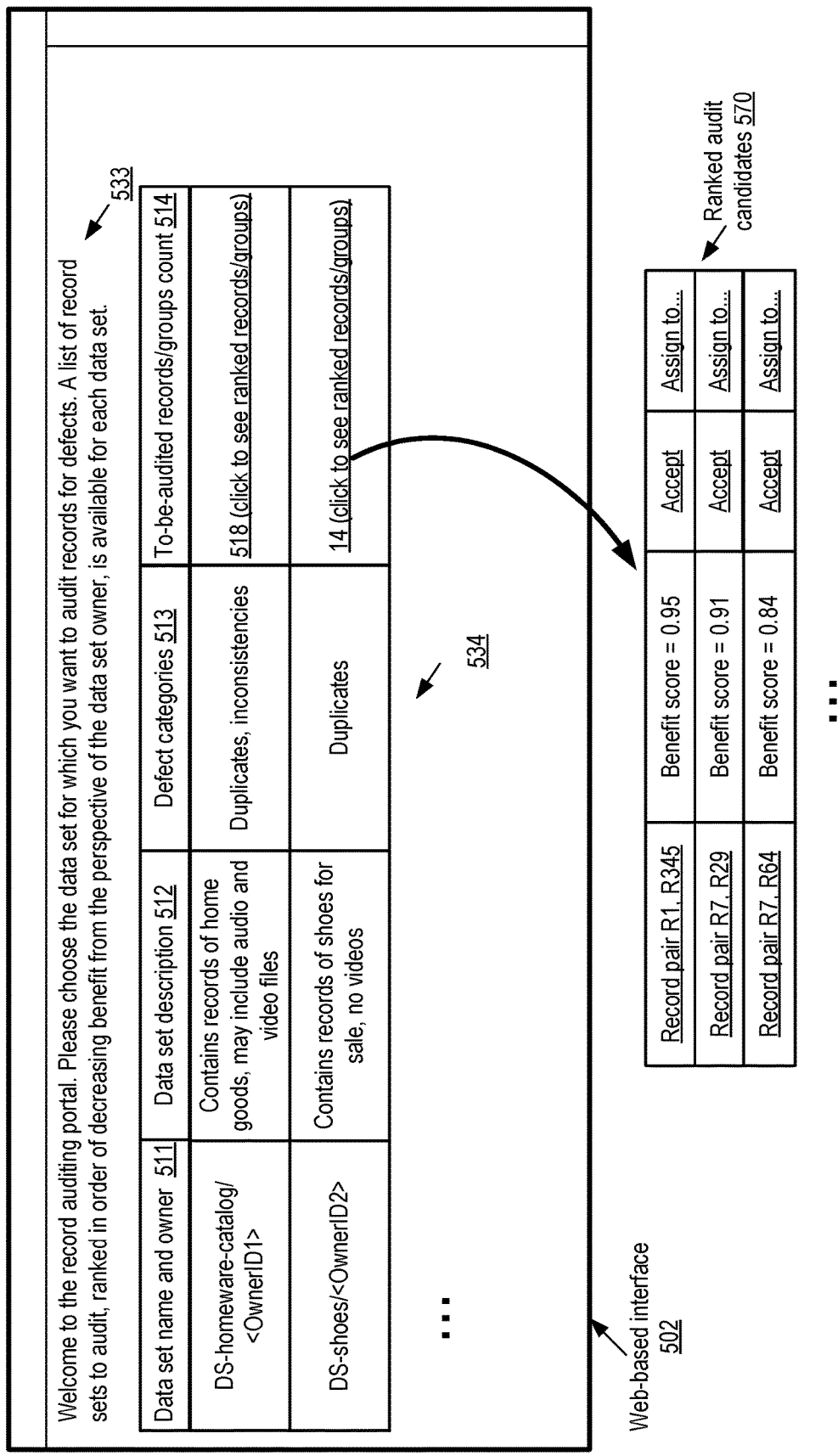
FIG. 5 illustrates an example graphical user interface which may be used to present outstanding defect detection tasks to potential auditors in order of importance, according to at least some embodiments.

FIG. 5 illustrates an example graphical user interface which may be used to present outstanding defect detection tasks to potential auditors in order of importance, according to at least some embodiments. A web-based interface 502 representing a portion of a portal accessible to auditors is shown in FIG. 5; other types of graphical user interfaces may be used in other embodiments. In the depicted embodiment, a welcome message 533 informs auditors who have logged into the portal that one or more data sets have at least some records which remain to be audited, and that the auditors can choose which data set they wish to audit.

Table 534 of the web-based interface contains respective rows with information about individual data sets, including the data set name and owner 511, a data set description 512, one or more defect categories 513 for which auditing is requested, as well as a count 514 of to-be-audited record or record groups for each data set. For some data sets, such as DS-homeware-catalog in the depicted example, the records or record groups may be analyzed for several types of defects, such as duplicates as well as inconsistencies; for other data sets, such as DS-shoes, only a single defect category 513 such as duplicates may be indicated in the interface 502.

An auditor may select one of the data sets and view a corresponding list of ranked audit candidates 570 in the depicted embodiment, e.g., by clicking on a link or using some other similar interface element. The audit candidates in the list may be arranged in decreasing order of audit benefit score in some embodiments, with the benefit scores being computed based on several factors such as defect presence probabilities, remediation values and the like. In some embodiments, customized values for benefit scores may be generated for respective auditors, e.g., based on individual auditors' skill sets, expertise, measured efficiency, etc. Thus, a given auditor A1 may in some cases see a different ranked list of audit candidates than another auditor A2, even if the same set of records/record groups remain to be audited.

In the depicted embodiment, the benefit scores for different records or record groups of the ranked audit candidates may be displayed in the list of ranked audit candidates 570. In other embodiments, the actual values of the benefit estimates may not necessarily be shown, although the records may be sorted in descending (or ascending, if desired) order of estimated benefits and displayed in sorted order. In one embodiment, the defect presence probabilities and/or the remediation values, which contribute to the audit benefits or importance scores, may also or instead be displayed for the ranked audit candidates. An auditor may use the "Accept" link shown for a given ranked audit candidate 570 to indicate that the auditor intends to work on the audit candidate, and this may remove the audit candidate from the to-be-audited group, resulting in dynamic updates to the table 534 and the displayed ranked audit candidates 570. As and when an auditor accepts a given audit candidate, the corresponding to-be-audited records/groups count 514 may be dynamically decremented, for example, and the row corresponding to the accepted candidate may be dynamically removed from the corresponding list of ranked audit candidates 570. An auditor or administrator may also use the "Assign to" links to assign individual record groups to other auditors in the depicted embodiment, which may also result in similar dynamic updates to the table 534 and the displayed ranked audit candidates. Information about the data sets, outstanding to-be-audited records and/or record groups may be presented to auditors in other ways than that depicted in FIG. 5 in some embodiments.

In at least some embodiments, the set of ranked audit candidate record groups identified and presented to auditors for a given data set may include candidates for more than one defect category. For example, a single ranked candidate record group may include some candidate record groups whose predicted defect presence probabilities for duplicates exceeded a threshold, and other candidate record groups predicted defect presence probabilities for content policy violations exceeded a threshold.

Figure 6:
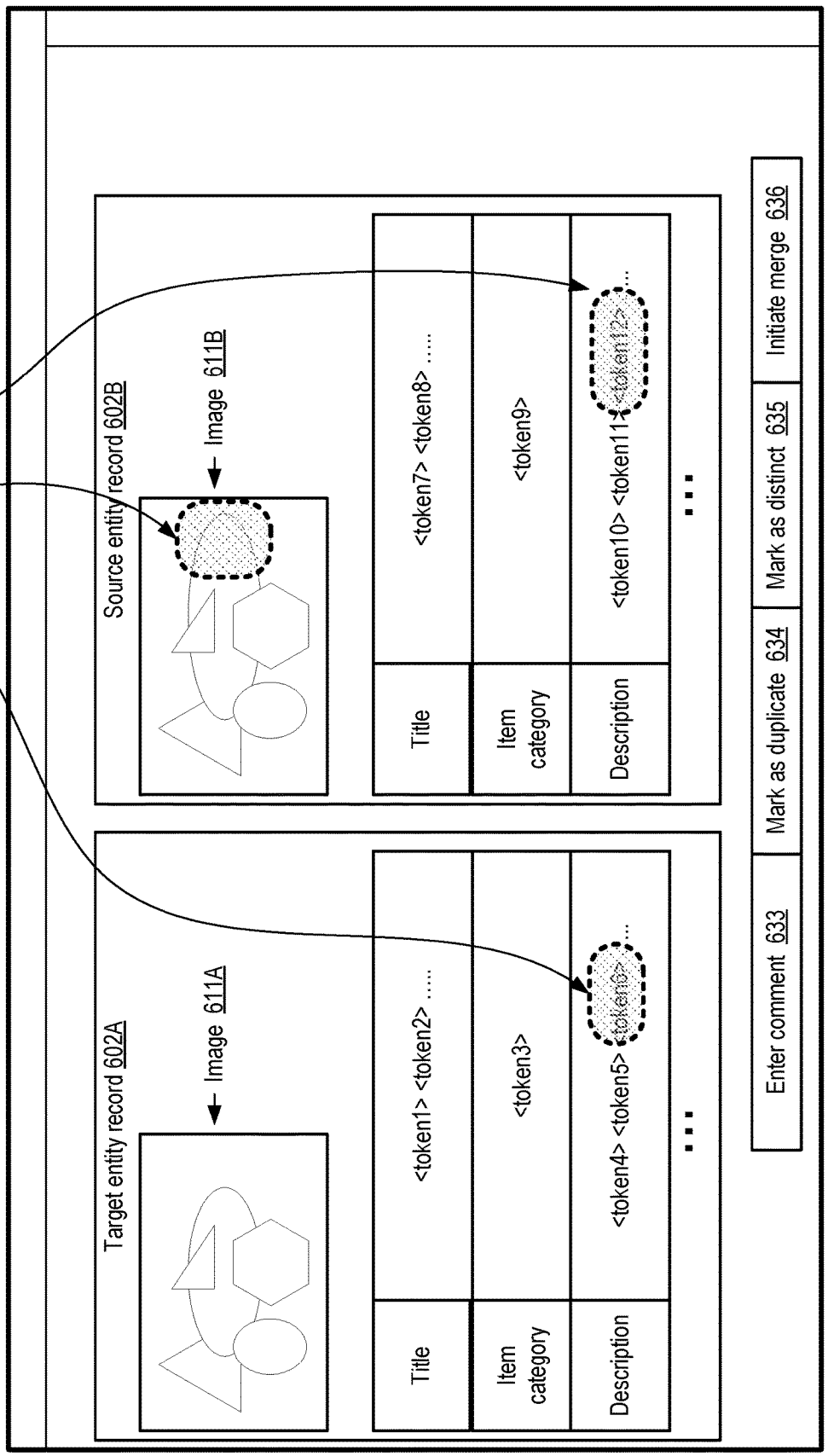
FIG. 6 illustrates an example graphical user interface which may be supported to enable an auditor to provide feedback about a pair of potentially duplicated records, according to at least some embodiments.

FIG. 6 illustrates an example graphical user interface which may be supported to enable an auditor to provide feedback about a pair of potentially duplicated records, according to at least some embodiments. In the depicted embodiment, web-based interface 622 shows text as well as non-text content of a target entity record 602A and a source entity record 602B in a scenario in which the auditor is to make a decision as to whether the two entity records are duplicates (i.e., whether they represent the same real-world entity). Respective images 611A and 611B of the two entity records may be presented via interface 622, as well as respective sets of text tokens of attributes such as "Title", "Item category", "Description" and so on.

The contents of the two records may be displayed to the auditor, for example, in response to the acceptance of the record pair via an interface element similar to the "Accept" elements shown in FIG. 5 in at least some embodiments. Web-based interface 622 may comprise several feedback elements such as "Enter comment" 633, "Mark as duplicate" 634, "Mark as distinct" 635, "Initiate merge" 636 and the like in the depicted embodiment. After examining/comparing the contents of the two records, the auditor may use the "Mark as duplicate" element to indicate that the auditor has concluded that the two records are duplicates of one another. If the auditor decides that the two records are not duplicates, the "Mark as distinct" element may be used. An automated de-duplication remediation action such as a merging of the two records may be initiated using the "Initiate merge" element in the depicted embodiment. In other embodiments, such automated remediation operations may instead be initiated in response to the auditor using the "Mark as duplicate" interface element, instead of requiring the auditor to use a second interface element such as "Initiate merge". An auditor may enter comments, such as explanations of why the duplicate or non-duplicate decision was reached, using the "Enter comment" interface element 633 in the depicted embodiment. In at least some embodiments, audit results provided via interfaces such as interface 622 may automatically result in adding additional labeled records being added to training data sets of machine learning models from which defect presence probability scores were obtained for record pairs such as target and source records 602, and to the automated re-training of such models using the augmented training data (or using only the additional labeled records). In some embodiments, in addition to user interface elements that enable auditors to confirm the presence of defects (such as "Mark as defect") or confirm the absence of defects (such as "Mark as distinct"), elements which enable auditors to indicate the absence of a confirmation (such as "Duplication status unconfirmed") may be provided. In one embodiment, an auditor may use such an interface element to indicate that, because of the uncertainty regarding defect status, the particular record group or record being analyzed should not be added to a training data set for the machine learning model.

In order to simplify the auditor's task, portions of the contents of the records shown via the interface 622 which may be more useful than others in making defect presence/absence decisions may be highlighted in the depicted embodiment as indicated by label 699. For example, a portion of a non-text attribute such as image 611B may be highlighted (e.g., by using a custom color, by depicting a boundary, by showing cross-hatches) etc. to indicate differences with the corresponding attribute (e.g., image 611A), some text tokens of one or more of the records (such as token6 of target entity record 602A and token12 of source entity record 602B) may be highlighted to indicate differences or similarities among the records, and so on. Any of a variety of visual cues, such as different fonts, the use of bold or italicized text, different colors, and the like may be used to indicate aspects of the record contents to which it may be helpful to pay closer attention when deciding whether the defect exists or not in different embodiments. Such potentially significant portions of text as well as non-text attributes may be identified prior to the presentation of the records to the auditors using one or more machine learning models (either the same models from which the defect presence probabilities were determined, or other machine learning models) in some embodiments. In effect, the visual cues may indicate a particular portion of an attribute recommended for analysis by the auditors to determine the defect status (e.g., the verified presence/absence of the defect) of the corresponding record or record group.

Depending on the specific categories of defects to be identified, other combinations of graphical user interface elements may be provided than those shown in FIG. 6 in various embodiments. For example, if the auditor is to find potential inconsistencies, interface elements that allow the auditor to indicate the specific text tokens or image portions which are inconsistent with one another may be provided. If the auditor is to find errors, interface elements which enable the text tokens or non-text attributes which contain the errors may be provided, and so on. A single graphical user interface that allows several different types of defects to be detected and reported may be supported in some embodiments—e.g., an "error marking" tool may be provided as an element of the interface 622, so that if the auditor finds errors in the text of one or both records shown, or finds that the image of one or both records appears to be incorrect, the auditor can point out the locations of the errors within the records' content. Other types of user interfaces may be supported in some embodiments for auditors to view outstanding audit candidates, accept auditing tasks, and/or verify the presence or absence of defects than the web-based interfaces of FIG. 5 and FIG. 6.

Example Programmatic Interactions

Figure 7:
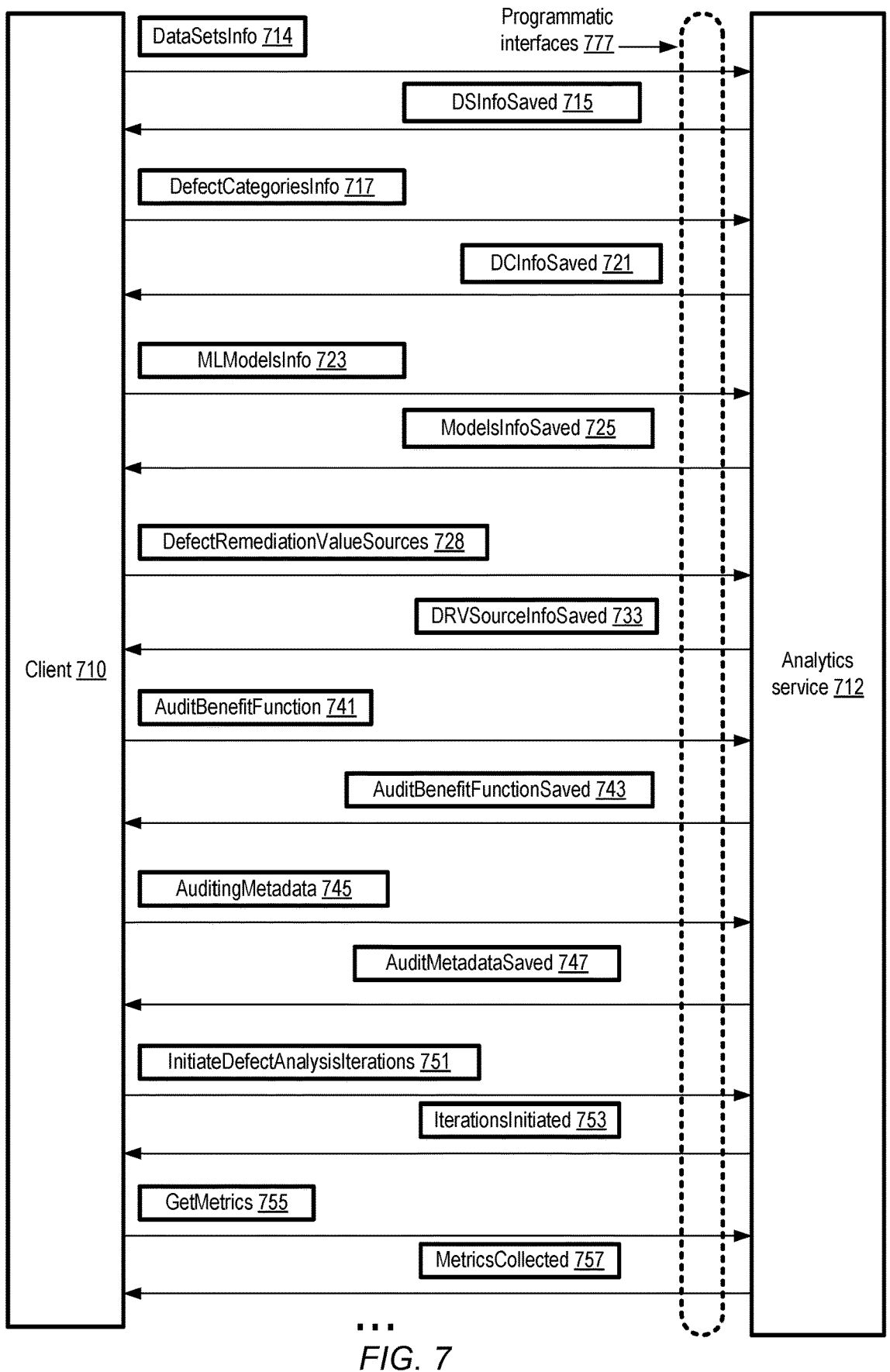
FIG. 7 illustrates example programmatic interactions pertaining to defect detection and remediation for data sets, according to at least some embodiments.

FIG. 7 illustrates example programmatic interactions pertaining to defect detection and remediation for data sets, according to at least some embodiments. An analytics service 712, similar in features and functionality to analytics service 102 of FIG. 1, may implement a set of programmatic interfaces 777 in the depicted embodiment, enabling clients 710 of the service (such as data set owners/administrators) to submit messages/requests pertaining to defect analysis of entity records and receive corresponding responses. The interfaces 777 may include, among others, one or more web-based consoles, a set of application programming interfaces (APIs), command-line tools, graphical user interfaces and the like in various embodiments.

Information about the data sources from which target data sets which are to be analyzed for defects may be provided by a client 710 in one or more DataSetsInfo messages 714 sent via programmatic interfaces 777 in the depicted embodiment. After the provided information is saved at the analytics service 712, a DSInfoSaved response message 715 may be sent to the client in some embodiments.

Using one or more DefectCategoriesInfo messages 717, a client 710 may define or indicate one or more categories of defects which are to be detected within the target data sets in the depicted embodiment. In some embodiments, the analytics service may provide a list of defect categories whose detection is supported natively at the service, and the client may indicate which specific ones of the defect categories are of interest and/or define one or more custom categories using the programmatic interfaces 777. The information about the defect categories may be stored at the analytics service and a DCInfoSaved response message 721 may be transmitted to the client in at least some embodiments.

In some embodiments, a client 710 may indicate or provide one or more preferred machine learning models to be used to detect defect presence probabilities, e.g., using one or more MLModelsInfo messages 723. In some embodiments, the client 710 may provide an initial trained version of a model, and allow the analytics service to iteratively retrain the model using new labeled training data obtained based on audit results as discussed earlier. In other embodiments, the client 710 may use MLModelsInfo messages 723 to indicate a type of model to be trained (e.g., by specifying a regression algorithm, a neural network-based algorithm, a decision tree based algorithm, etc., or by choosing from a suite of algorithms or model types of the analytics service), various hyper-parameters of the model, and a labeled training data set to be used for the first trained version of the model, and the initial training of the model may be conducted at the analytics service 712. After the preferences indicated in the MLModelsInfo message(s) 723 is received and stored, the analytics service 712 may send a ModelsInfoSaved message 725 to the client via the programmatic interfaces 777 in the depicted embodiment.

Information about the sources from which defect remediation values or importance scores can be obtained for various record groups may be provided by a client 710 via one or more DefectRemediationValueSources messages 728 in the depicted embodiment. For example, in a store catalog context, the client may indicate programs or web sites from which 30-day or 15-day trailing page view counts can be obtained for web pages associated with the records for which defect analysis is to be performed, search result counts for such web pages can be obtained, return or sales data for the items represented by the records can be obtained, etc., and how such application-specific metrics are to be used to determine quantitative defect remediation values in one embodiment. The data about the defect remediation sources may be saved, and a DRVSourceInfoSaved message 733 may be sent to the client in at least one embodiment.

In some embodiments, a client 710 may specify the particular mathematical/statistical functions, algorithms or programs to be used to compute the audit benefit estimates for records or record groups for particular defect categories, e.g., based on factors such as the defect presence probabilities obtained from the machine learning models, the defect remediation value scores, audit complexity scores, and so on. Such information may be conveyed to the analytics service 712 via one or more AuditBenefitFunction messages 741 in the depicted embodiment. The analytics service may send one or more AuditBenefitFunctionSaved messages 743 in response to the AuditBenefitFunction messages in at least some embodiments after storing the information provided.

In at least one embodiment, a client 710 may provide metadata about auditors to be used for determining the defect status of the client's records, including such information as the identifiers or names of the auditors, their skill sets or areas of expertise, the kinds of metrics which can be collected pertaining to auditors (for which permission is obtained from the auditors in advance), and so on. Such information may be provided in one or more AuditingMetadata messages 745 sent to the analytics service in some embodiments. The analytics service 712 may save the auditing metadata and send an AuditMetadataSaved response message 747 to the client.

According to some embodiments, a client 710 may trigger the initiation of an iterative defect analysis workflow for one or more target data sets, similar to the workflow discussed in the context of FIG. 3, by sending an InitiateDefectAnalysisIterations message 751 via programmatic interfaces 777. The iterations may then be started by the analytics service, and an IterationsInitiated message 753 may be sent to the client 710 in the depicted embodiment.

The analytics service may collect various metrics as the iterations are conducted, such as counts of records or record groups audited for defects in different iterations, the number of defects found and remediated, machine learning quality metrics from the different iterations of training of the models, the auditing costs incurred in various iterations, and so on in various embodiments. Clients who wish to view such metrics may send one or more GetMetrics requests 755 via programmatic interfaces 777, and receive values of the requested metrics in one or more MetricsCollected messages 757.

In some embodiments, a different combination of programmatic interactions pertaining to defect analysis may be supported than those shown in FIG. 7. For example, programmatic interactions may be used by clients to specify downstream applications to which audit results are to be provided, to define thresholds for selecting audit candidates, and so on.

Example Provider Network Environment

Figure 8:
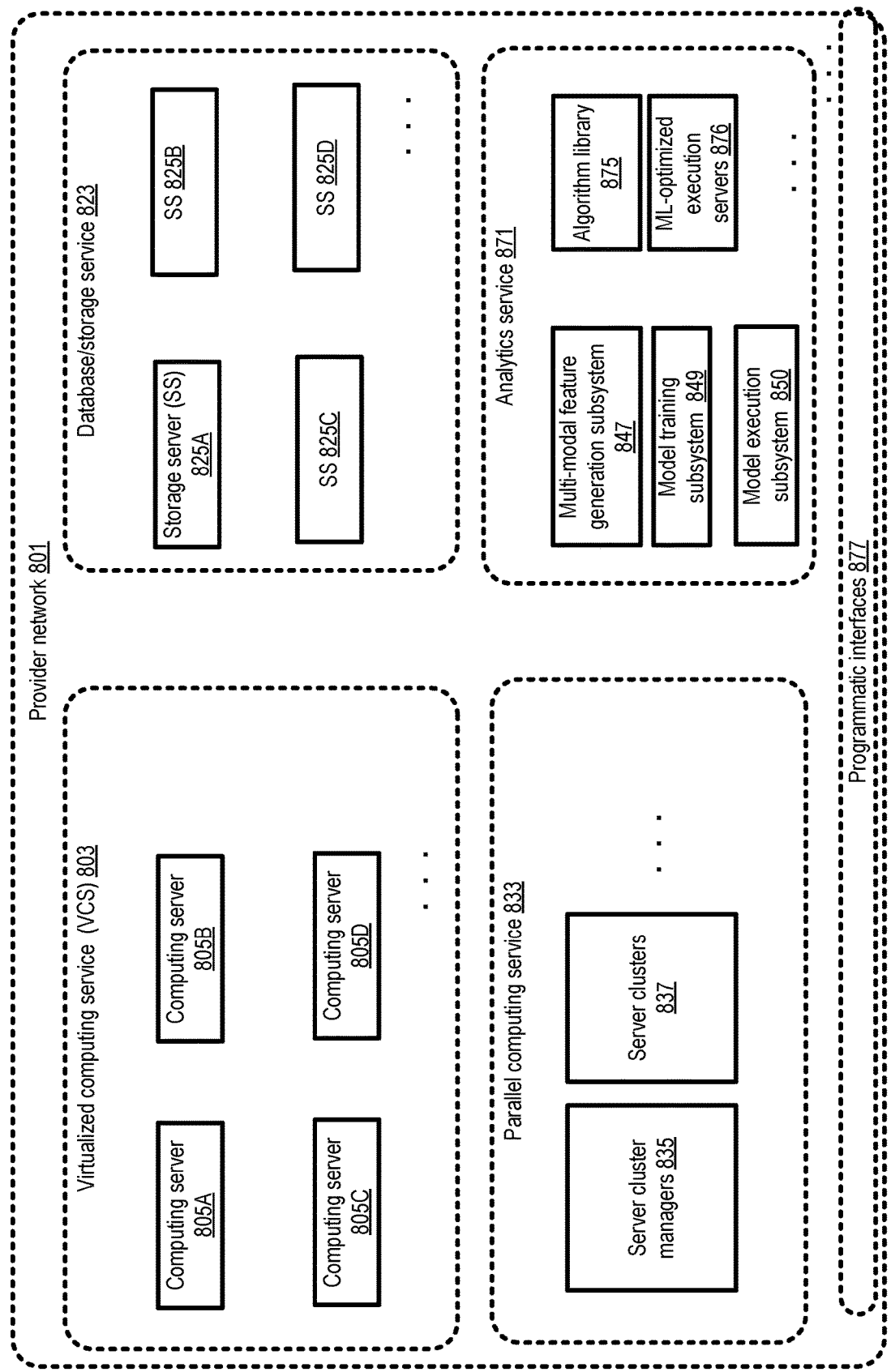
FIG. 8 illustrates an example provider network environment in which an analytics service may be used to iteratively detect defects within data sets and initiate remediation actions, according to at least some embodiments.

In some embodiments, as mentioned earlier, an analytics service at which defect analysis techniques similar to those described above may be implemented at a provider network. FIG. 8 illustrates an example provider network environment in which an analytics service may be used to iteratively detect defects within data sets and initiate remediation actions, according to at least some embodiments. In the depicted embodiment, provider network 801 may comprise resources used to implement a plurality of services, including for example a virtualized computing service (VCS) 803, a database/storage service 823, and a parallel computing service 833 as well as an analytics/machine learning service 871 within which at least some phases of an iterative technique for detecting and resolving defects similar to the technique discussed in the context at FIG. 3 may be implemented. The analytics service 871, which may also be referred to as a machine learning service or an artificial intelligence service, in turn may comprise algorithm library 875, a multi-modal feature generation subsystem 847 (at which features from text as well as non-text attributes of the records being analyzed for defects may be extracted), model training subsystem 849 at which various models used for predicting defect presence probabilities may be trained and re-trained using algorithms from library 875, model execution subsystem 850 at which the models arte executed, and machine learning-optimized execution servers 876 in the depicted embodiment. The parallel computing service 833 may comprise various server clusters 837, each comprising a plurality of servers, on which parallelizable workloads may be distributed by a set of server cluster managers 835 in the depicted embodiment. Some of the algorithms implemented at the analytics service 871 may be parallelizable, and may utilize the server clusters 837 in at least some embodiments.

Components of a given service may utilize components of other services in the depicted embodiment—e.g., for some analytics service tasks, virtual machines implemented at computing servers such as 805A-805D of the virtualized computing service 803 may be used, server clusters 837 and/or cluster managers 835 may be utilized for parallelizable computations of the analytics service, input data (e.g., target data sets) and/or output produced at the analytics service may be stored at storage servers 825 (e.g., 825A-825D) of storage service 823, and so on. Individual ones of the services shown in FIG. 8 may implement a respective set of programmatic interfaces 877 which can be used by external and/or internal clients (where the internal clients may comprise components of other services) in the depicted embodiment.

In some embodiments, at least some aspects of the sensitive data detection techniques described herein may be implemented without acquiring resources of network-accessible services such as those shown in FIG. 8. For example, a standalone tool implemented at one or more computing devices which are not part of a network-accessible service may be used in one embodiment.

Methods for Defect Analysis

Figure 9:
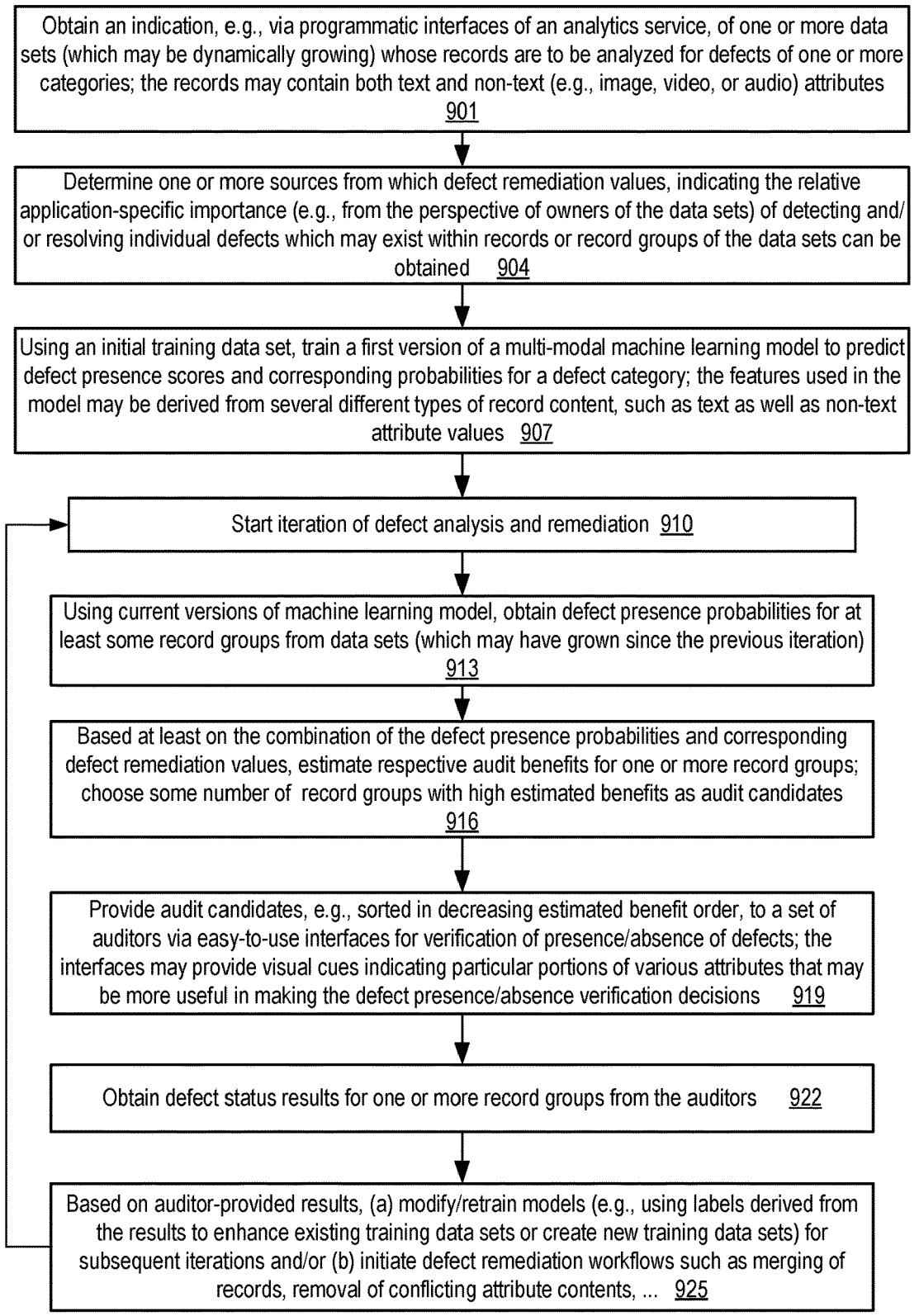
FIG. 9 is a flow diagram illustrating aspects of operations that may be performed to iteratively detect defects within data sets and initiate remediation actions, according to at least some embodiments.

FIG. 9 is a flow diagram illustrating aspects of operations that may be performed to iteratively detect defects within data sets and initiate remediation actions, according to at least some embodiments. As shown in element 901, an indication may be obtained, e.g., via programmatic interfaces of an analytics service, of one or more data sets (which may grow dynamically) whose records are to be analyzed for defects of one or more categories. Each data set may comprise a plurality of entity records intended to represent respective real-world items, objects, individuals or the like. A given record may contain several different types of content in at least some embodiments; e.g., both text and non-text (e.g., image, video, or audio) attributes may be included. Note that not all records may necessarily have to include both text and non-text attributes. The records may be somewhat heterogeneous in some embodiments, in that they may have been generated/populated by a variety of individuals or sources, or on accordance with a variety of schemas, so that some attributes may not have values for some records, or information may have been placed in the wrong attribute, and so on. In at least some embodiments, descriptors or definitions of the categories of defects to be detected, such as duplicated records, records with inconsistent attribute values, records containing content which violated policies, or wrongly classified records may also be obtained.

One or more sources from which defect remediation values, indicating the relative application-specific importance (e.g., from the perspective of owners of the data sets) of detecting and/or resolving individual defects which may exist within records or record groups of the data sets can be obtained may be determined or identified in various embodiments (element 904). The motivation for obtaining such defect remediation values may be expressed as follows: in order to confirm the presence or absence of at least some defects, the help of human auditors may be needed. Such human auditors may represent a scarce resource in at least some embodiments, so the auditors should preferably be given the opportunity to work on analyzing those records whose defect detection is likely to be most valuable to the data set owners. In at least some cases, the records which are most likely to contain defects (as detected, for example, by machine learning models) may not necessarily be the ones for which defect remediation is most important for the data set owners.

Using an initial training data set comprising labeled record groups (where a given record group may include one or more records, depending on the defect category), a first version of a machine learning model to predict defect presence scores and corresponding defect presence probabilities for a given defect category of interest may be trained in various embodiments (element 907). The features used in the model may be derived/generated from several different types of record content, such as values of text, images, videos and other attributes in some embodiments, and/or the model may comprise respective text and non-text analysis subcomponents. As such, the model may be referred to as a multi-modal model. Note that even though the model may be capable of analyzing both text and non-text attributes, it may nevertheless be capable of generating defect presence scores/probabilities for a record (or record group) that contains only text attribute values, or only non-text attribute values, in at least some embodiments. Any of a variety of machine learning algorithms may be used in different embodiments, such as regression algorithms, decision-tree based algorithms, neural network-based algorithms, and so on. In some embodiments, respective models may be trained for each of the different defect categories to be addressed; in other embodiments, a single model may be used to generate probabilities for several different defect categories.

The next iteration of one or more iterations of defect analysis and remediation with respect to the defect category and the data sets may be initiated (element 910). Using the current versions of machine learning model(s), defect presence probabilities for at least some record groups selected from the data sets (which may have grown since the previous iteration) may be obtained (element 913). In some embodiments, samples of record groups may be extracted from the data sets and provided as input to the model, e.g., instead of obtaining defect presence probabilities from all possible record groups of the data sets.

Based at least partly on the combination of their defect presence probabilities and corresponding defect remediation values obtained from the sources identified in operations corresponding to element 904, respective audit benefits may be obtained for one or more record groups (element 916) in the depicted embodiment. Some number of the record groups with higher estimated benefits than others may be identified as audit candidates, i.e., candidates to be presented to auditors, in various embodiments. In one embodiment, the analytics service may determine the number N of audit candidate record groups to be presented to a set of auditors in the current iteration, e.g., based on the number of auditors available, the skill sets of the auditors, the time by which defect status results are to be obtained, etc. Then, in such embodiments, the N audit candidate records with the highest estimated audit benefits may be identified.

The audit candidates may be presented, e.g., sorted in decreasing estimated benefit order, to a set of auditors via easy-to-use interfaces for verification of presence/absence of defects in various embodiments (element 919). The interfaces may, for example, provide visual cues (similar to those depicted in FIG. 6) indicating particular portions of various attributes that may be more useful in making the defect presence/absence verification decisions.

Defect status results may be obtained via the interfaces for at least some of the presented record groups (element 922) in some embodiments. Such audit results may be expressed in various forms in different embodiments, depending on the category of defect. For example, in some cases in which the auditors are to verify whether a record pair consists of duplicates or not, the defect status may be indicated in a binary manner: "yes" for duplicates or "no" for non-duplicates. In other cases, more details may be provided by an auditor (e.g., indicating why the auditor reached the decision), or the auditor may provide a probabilistic result rather than a binary result. In a scenario in which an auditor is requested to verify whether one or more attributes comprise errors or inconsistencies, the auditor may provide an array of results, one array element per attribute indicating whether than attribute contained an error or not.

Based on the auditor-provided results, one or more types of operations may be performed in the depicted embodiment (element 925). For example, using the defect status indicated in the results, labels which can be used to re-train the machine learning models may be assigned to the corresponding record groups. In some cases, the newly-labeled records may be added to the earlier training data set, thereby enlarging the training data set, and the model may be retrained using the larger training data set. In other cases, the newly-generated labels may be used to generate a new training data set, and the model may be re-trained using the new training data set. In addition, in at least some embodiments, automated defect remediation workflows or actions such as merging records found to be duplicates, removing conflicting attribute contents, and the like may be initiated. In some cases, one or more of the remediation actions may comprise manual steps. The retrained or modified model may then be used for at least one subsequent iteration of defect detection and remediation, in which operations corresponding to elements 910 onwards may be performed.

It is noted that in various embodiments, some of the operations shown in the flow diagram of FIG. 9 may be implemented in a different order than that shown in the figure, or may be performed in parallel rather than sequentially. Additionally, some of the operations shown in FIG. 9 may not be required in one or more implementations.

Use Cases

The techniques described above, of performing iterative defect analysis using a combination of continually-improved defect detection machine learning models and importance-based auditing of possible defects may be extremely beneficial in a variety of scenarios. For example, such techniques may be used to identify and remove/merge duplicate records from store catalogs, to identify similar medical conditions among different patients, and so on. The proposed techniques may also be used to enhance the quality of search results, to organize products of a catalog appropriately, and for other similar applications.

Illustrative Computer System

Figure 10:
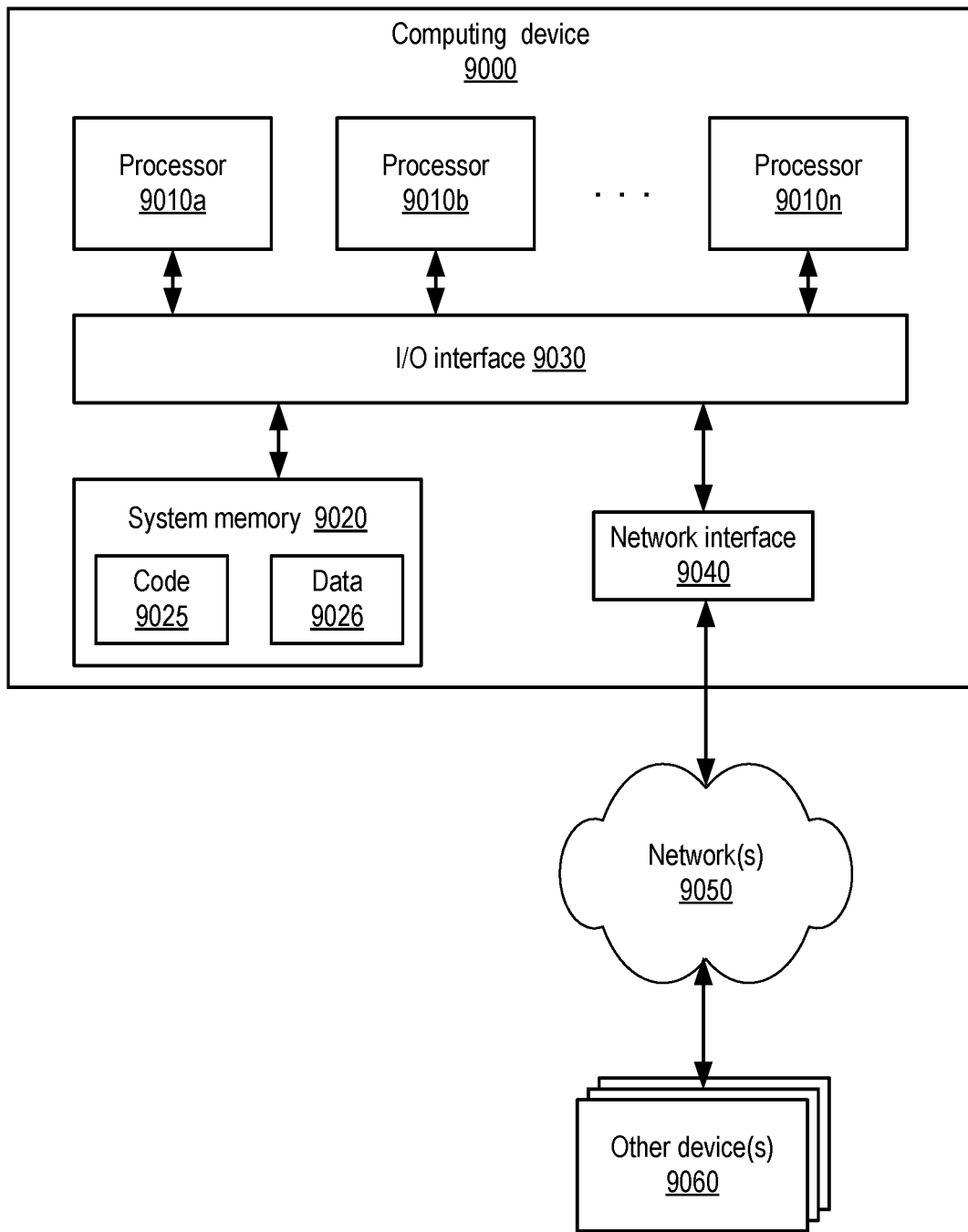
FIG. 10 is a block diagram illustrating an example computing device that may be used in at least some embodiments.

In at least some embodiments, a server that implements the types of techniques described herein (e.g., various functions of an analytics service), may include a general-purpose computer system that includes or is configured to access one or more computer-accessible media. FIG. 10 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 9, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 9. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 10 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across the one or more computing devices cause the one or more computing devices to:
obtain an indication of one or more defect categories associated with a target data set of records, wherein individual records of the target data set comprise a plurality of attributes including at least one text attribute and at least one non-text attribute; and
initiate one or more defect analysis and remediation iterations, wherein a particular defect remediation iteration comprises:
determining, using one or more multi-modal machine learning models whose feature sets includes a combination of one or more text features and one or more non-text features, a respective defect presence probability corresponding to one or more defect categories and a respective record group comprising one or more records of the target data set, wherein a defect presence probability of a record group represents a probability of a presence of a defect within the record group;
assigning, corresponding to individual record groups whose defect presence probability corresponding to a first defect category exceeds a first threshold, a respective first estimated audit benefit, wherein an estimated audit benefit represents estimate of a benefit of an audit of a record group by an auditor, and wherein the estimated audit benefit assigned to a first record group is based at least in part on (a) the defect presence probability of the first record group representing a probability of a presence of a defect within the first record group and (b) an application-specific defect remediation value assigned to the first record group with respect to the first defect category, wherein the defect remediation value represents importance of remediation of the defect within the first record group by the auditor;
causing to be presented, via one or more programmatic interfaces, a first audit candidate set to a first auditor group comprising one or more auditors, wherein the first audit candidate set indicates relative estimated audit benefits representing benefits of audits of individual ones of one or more record groups, including at least some record groups whose respective first defect presence probabilities exceed the first threshold;
obtaining audit results generated by the first auditor group for the at least some record groups indicated in the first audit candidate set, wherein a particular audit result generated for a particular record group indicates a verification of a presence of a defect in the particular record group; and
initiating, based at least in part on a portion of the audit results, (a) preparation of at least one machine learning model for use in a subsequent defect analysis and remediation iteration and (b) one or more automated remediation actions with respect to the particular record group.

2. The system as recited in claim 1, wherein the first defect category comprises one or more of: (a) record duplication, (b) conflicting attribute values, (c) violations of content policy, (d) incorrect record grouping, or (e) erroneous attribute values.

3. The system as recited in claim 1, wherein the one or more defect categories include a second defect category, and wherein the one or more computing devices include further instructions that upon execution on or across the one or more computing devices further cause the one or more computing devices to:
train another machine learning model to generate a defect presence probability corresponding to the second defect category for a second input record group;
utilize the generated defect presence probability corresponding to the second defect category to assign an estimated audit benefit to the second input record group; and
cause, based at least in part on the estimated audit benefit of the second input record set, the second input record group to be presented to one or more auditors of the auditor group.

4. The system as recited in claim 1, wherein the one or more computing devices include further instructions that upon execution on or across the one or more computing devices further cause the one or more computing devices to:
obtain respective sets of metadata associated with the first auditor group and a second auditor group, wherein the second auditor group comprises one or more auditors absent from the first auditor group; and
determine, based at least in part on the respective sets of metadata, that (a) the first audit candidate set is to be presented to the first auditor group and (b) a second audit candidate set is to be presented to the second auditor group.

5. The system as recited in claim 1, wherein the one or more computing devices include further instructions that upon execution on or across the one or more computing devices further cause the one or more computing devices to:
compute the application-specific defect remediation value assigned to the first input record group based at least in party on an analysis of one or more web site metrics.

6. A computer-implemented method, comprising:
performing one or more defect analysis iterations with respect to a collection of records, wherein a particular defect analysis iteration comprises:
determining, using one or more machine learning models, a respective defect presence probability corresponding to one or more defect categories with respect to one or more record groups, wherein a record group of the one or more record groups includes one or more records of the collection, and wherein a defect presence probability of a record group represents a probability of a presence of a defect within the record group;
assigning, corresponding to individual record groups whose first defect presence probability corresponding to a first defect category of the one or more defect categories exceeds a first threshold, a respective first estimated audit benefit, wherein a first estimated audit benefit represents estimate of a benefit of an audit of a record group by an auditor corresponding to defects of the first defect category, and wherein the first estimated audit benefit assigned to a first record group is based at least in part on (a) a first defect presence probability of the first record group and (b) a defect remediation importance score of the first record group with respect to the first defect category, wherein the defect remediation importance score represents importance of remediation of a defect within the first record group;
providing, to one or more auditors, indications of respective estimated audit benefits representing benefits of audits of one or more record groups; and
initiating, based at least in part on an audited defect status indicated by the one or more auditors with respect to a particular record group, one or more automated actions.

7. The computer-implemented method as recited in claim 6, wherein an automated action of the one or more automated actions comprises: (a) a retraining of a machine learning model of the one or more machine learning models, (b) a merge of records of the particular record group, (c) a re-organization of at least a portion of a store catalog, or (d) a correction of one or more attribute values of one or more records of the particular record group.

8. The computer-implemented method as recited in claim 6, wherein said providing, to the one or more auditors, the indications of the respective estimated audit benefits comprise:
identifying an outstanding record group set comprising a plurality of record groups which have not yet been selected for analysis by the one or more auditors;
sorting record groups of the outstanding record group set based at least in part on their respective estimated audit benefits; and
causing record groups of the outstanding record groups to be presented to the one or more auditors in an order based on a result of the sorting.

9. The computer-implemented method as recited in claim 6, wherein the one or more record groups whose indications of estimated audit benefits is provided to the one or more auditors comprises (a) a first record group whose first defect presence probability corresponding to the first defect category exceeds the first threshold and (b) a second record group whose second defect presence probability corresponding to a second defect category of the one or more defect categories exceeds a first threshold.

10. The computer-implemented method as recited in claim 6, further comprising:
assigning a defect auditing complexity score to the first record group, wherein the first estimated audit benefit assigned to the first record group is based at least in part on the defect auditing complexity score.

11. The computer-implemented method as recited in claim 6, wherein the defect remediation importance score of the first record group with respect to the first defect category is based at least in part on one or more of: (a) view metrics of a store web site, (b) search metrics of the store web site, or (c) transaction data of a store web site.

12. The computer-implemented method as recited in claim 6, wherein at least one machine learning model of the one or more machine learning models comprises a text analysis portion and a non-text analysis portion.

13. The computer-implemented method as recited in claim 6, wherein said determining, using the one or more machine learning models, the respective defect presence probability comprises:
obtaining respective raw defect presence scores from the one or more machine learning models; and
converting the respective raw defect presence scores into the respective defect presence probabilities using one or more of: (a) a smoothed isotonic regression algorithm or (b) Platt scaling.

14. The computer-implemented method as recited in claim 6, further comprising:
obtaining a programmatic request for defect analysis at a network-accessible service of a provider network, wherein the one or more defect analysis iterations are initiated based at least in part on the programmatic request.

15. The computer-implemented method as recited in claim 6, further comprising:
obtaining, via one or more programmatic interfaces, respective indications of: (a) one or more hyper-parameters of the one or more machine learning models, (b) an indication of the one or more auditors, (c) an indication of one or more sources of defect remediation importance scores.

16. One or more non-transitory computer-accessible storage media storing program instructions that when executed on or across one or more processors cause the one or more processors to:
perform one or more defect analysis iterations with respect to a collection of records, wherein a particular defect analysis iteration comprises:
determining, using one or more machine learning models, a respective defect presence probability corresponding to one or more defect categories with respect to one or more record groups of the collection, and wherein a defect presence probability of a record group represents a probability of a presence of a defect within the record group;
assigning, corresponding to one or more record groups for which respective defect presence probabilities were determined, a respective estimated audit benefit, wherein a first estimated audit benefit represents estimate of a benefit of an audit of a record group by an auditor corresponding to defects of the first defect category, and wherein the first estimated audit benefit assigned to a first record group is based at least in part on a defect remediation importance score of the first record group, wherein the defect remediation importance score represents importance of remediation of a defect within the first record group;

providing, to one or more auditors, indications of respective estimated audit benefits representing benefits of audits of the one or more record groups; and initiating, based at least in part on an audited defect status indicated by the one or more auditors with respect to a particular record group, one or more automated actions with respect to the particular record group.

17. The one or more non-transitory computer-accessible storage media as recited in claim 16, wherein a machine learning model of the one or more machine learning models comprises one or more of: (a) a regression model, (b) a decision tree based model, or (c) a neural network-based model.

18. The one or more non-transitory computer-accessible storage media as recited in claim 16, storing further program instructions that when executed on or across one or more processors further cause the one or more processors to:

cause one or more visual cues pertaining to one or more records of the particular record group to be presented to the one or more auditors, wherein a particular visual cue of the one or more visual cues indicates a particular portion of an attribute recommended for analysis by the one or more auditors to determine the audited defect status.

19. The one or more non-transitory computer-accessible storage media as recited in claim 16, storing further program instructions that when executed on or across one or more processors further cause the one or more processors to:

obtain, via one or more programmatic interfaces, an indication of a function, algorithm or program to be used to compute at least the first audit estimate benefit.

20. The one or more non-transitory computer-accessible storage media as recited in claim 16, storing further program instructions that when executed on or across one or more processors further cause the one or more processors to:

obtain, via a programmatic interface of a network-accessible service, an indication of the one or more machine learning models.

\* \* \* \* \*